(12) United States Patent
Zuckerman

(10) Patent No.: US 10,135,477 B2
(45) Date of Patent: Nov. 20, 2018

(54) SIGNAL CANCELLATION OF AMPLITUDE/ANGLE MODULATION NOISE USING FEEDFORWARD AND FEEDBACK TOPOLOGIES

(71) Applicant: TEXAS INSTRUMENTS INCORPORATED, Dallas, TX (US)

(72) Inventor: Lawrence Herbert Zuckerman, Livermore, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/009,813

(22) Filed: Jan. 28, 2016

(65) Prior Publication Data

US 2016/0218757 A1    Jul. 28, 2016

Related U.S. Application Data

(60) Provisional application No. 62/108,807, filed on Jan. 28, 2015.

(51) Int. Cl.
  *H04B 1/10* (2006.01)
(52) U.S. Cl.
  CPC .......... *H04B 1/109* (2013.01); *H04B 1/1036* (2013.01)
(58) Field of Classification Search
  CPC ...... H04B 1/1036; H04B 1/109; H04W 52/24
  (Continued)

(56) References Cited

U.S. PATENT DOCUMENTS

| | | | | |
|---|---|---|---|---|
| 5,894,473 A | * | 4/1999 | Dent | H04B 7/2618 370/320 |
| 6,266,320 B1 | * | 7/2001 | Hedberg | H04B 1/62 370/203 |
| 2017/0265145 A1 | * | 9/2017 | Benjebbour | H04W 52/24 |

* cited by examiner

*Primary Examiner* — Kevin M Burd
(74) *Attorney, Agent, or Firm* — Andrew Viger; Charles A. Brill; Frank D. Cimino

(57) ABSTRACT

A method for cancellation of amplitude modulation noise using feedforward or feedback topologies. The method is adaptable to cancel amplitude modulation noise (contamination) of an input signal, including: receiving an input signal including an amplitude modulation noise signal; demodulating the amplitude modulation noise signal to generate a baseband amplitude modulation noise signal; signal processing the baseband amplitude modulation noise signal to generate a amplitude re-modulation signal; and re-modulating the input signal based on the amplitude re-modulation signal to generate an output signal, the output signal having less amplitude modulation noise than the input signal. In a feedforward embodiment, the methodology includes: signal processing the baseband amplitude modulation noise signal based on signal inversion to generate the amplitude re-modulation signal; and feeding forward the amplitude re-modulation signal to re-modulate the amplitude re-modulation signal with the input signal. In a feedback embodiment, the methodology includes: receiving the input signal in a gain controlled amplifier, generating a gain-controlled output signal; detecting the amplitude of the amplitude noise modulation signal in the gain-controlled output signal to generate a feedback amplitude noise signal; integrating the feedback amplitude noise signal to generate a gain control signal; and adjusting the gain controlled amplifier based on the gain control signal, such that the gain-controlled output signal has less amplitude modulation noise than the input signal.

14 Claims, 17 Drawing Sheets

(58) Field of Classification Search
USPC .................................................. 375/316, 320
See application file for complete search history.

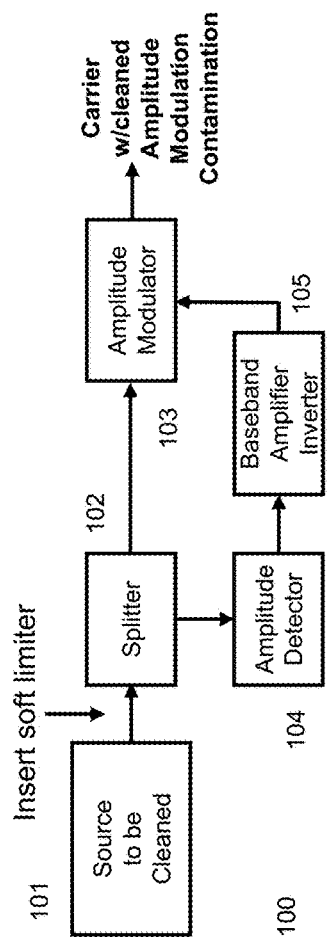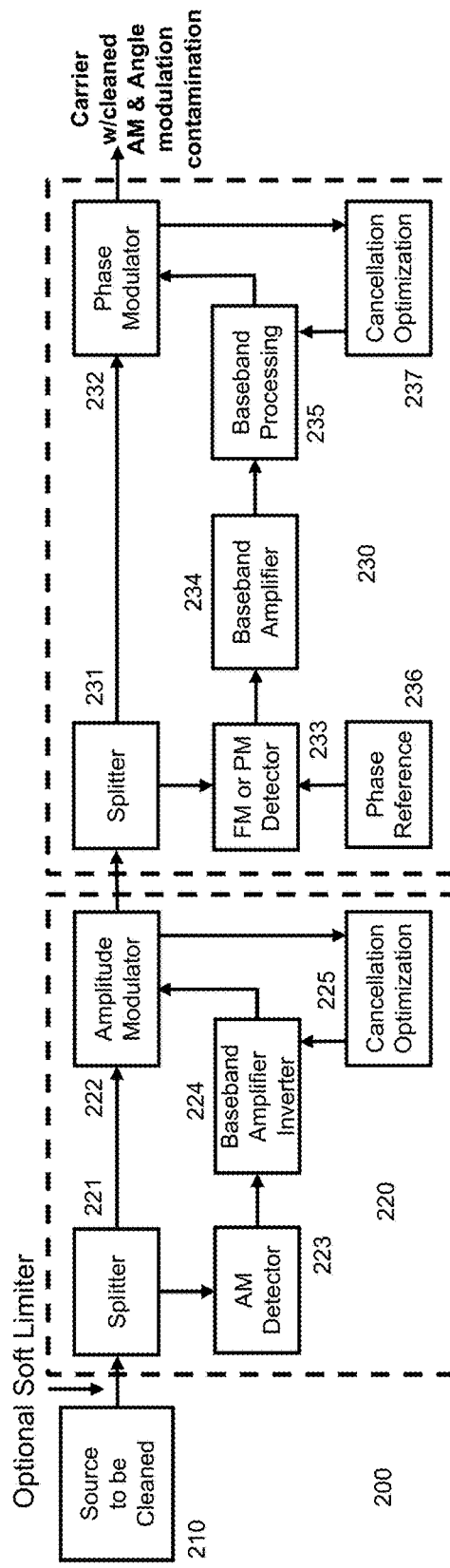

SIGNAL CANCELLATION OF AMPLITUDE/ANGLE MODULATION NOISE USING FEEDFORWARD AND FEEDBACK TOPOLOGIES

CROSS-REFERENCE TO RELATED APPLICATION

Priority is claimed under 37 CFR 1.78 and 35 USC 119(e) to U.S. Provisional Application 62/108,807 (TI-75827PS), filed 28 Jan. 2015), which is incorporated by reference.

BACKGROUND

Technical Field

This disclosure relates generally to noise cancellation for signal sources (such as timing generators and local oscillators).

Related Art

A key specification of signal sources, such as local oscillators and timing generators based on phase locked loop (PLL) frequency synthesizers, is phase noise or period jitter. Among other things, the amount of phase noise or period jitter affects spectral usage efficiency and the ability to encode and decode high-speed data with minimal errors.

U.S. Pat. No. 8,750,441 describes a noise cancellation method to reduce phase noise, deterministic spectral components (some known as spurious components, or "spurs"), and other forms of angle noise, that can be present in the outputs of signal sources that are co-located or otherwise. This noise cancellation method includes: (a) canceling angle noise separately from the generating source itself, without the need to provide long term frequency stability and accuracy, and (b) canceling noise spectral components that are both inside and outside the loop bandwidth of phase locked loops that can be present within the signal source.

The amount of amplitude noise, such as noise added in the transmission path, can also be a key specification. In particular, the existence of unwanted amplitude noise can adversely affect other processes, such as frequency modulation and demodulation. One solution is to remove amplitude modulation from the carrier as received prior to delivering it to the angle modulation detector, such as using a limiter. Limiter circuits, however, consume significant power.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for signal cancellation of amplitude/angle modulation noise using feedforward and feedback topologies.

According to aspects of the Disclosure, a method for cancellation of amplitude modulation noise using feedforward or feedback topologies. The method is adaptable to cancel amplitude modulation noise (contamination) of an input signal, including: receiving an input signal including an amplitude modulation noise signal; demodulating the amplitude modulation noise signal to generate a baseband amplitude modulation noise signal; signal processing the baseband amplitude modulation noise signal to generate a amplitude re-modulation signal; and re-modulating the input signal based on the amplitude re-modulation signal to generate an output signal, the output signal having less amplitude modulation noise than the input signal. In a feedforward embodiment, the methodology includes: signal processing the baseband amplitude modulation noise signal based on signal inversion to generate the amplitude re-modulation signal; and feeding forward the amplitude re-modulation signal to re-modulate the amplitude re-modulation signal with the input signal. In a feedback embodiment, the methodology includes: receiving the input signal in a gain controlled amplifier, generating a gain-controlled output signal; detecting the amplitude of the amplitude noise modulation signal in the gain-controlled output signal to generate a feedback amplitude noise signal; integrating the feedback amplitude noise signal to generate a gain control signal; and adjusting the gain controlled amplifier based on the gain control signal, such that the gain-controlled output signal has less amplitude modulation noise than the input signal.

Other aspects and features of the invention claimed in this Patent Document will be apparent to those skilled in the art from the following Disclosure.

BRIEF DESCRIPTION OF THE DRAWINGS

FIG. 1 illustrates and example embodiment for signal cancellation of amplitude modulation noise using a feedforward topologies.

FIG. 2 illustrates an example embodiment for signal cancellation of amplitude and angle modulation noise using a feedforward topologies.

DETAILED DESCRIPTION

Figure 3:
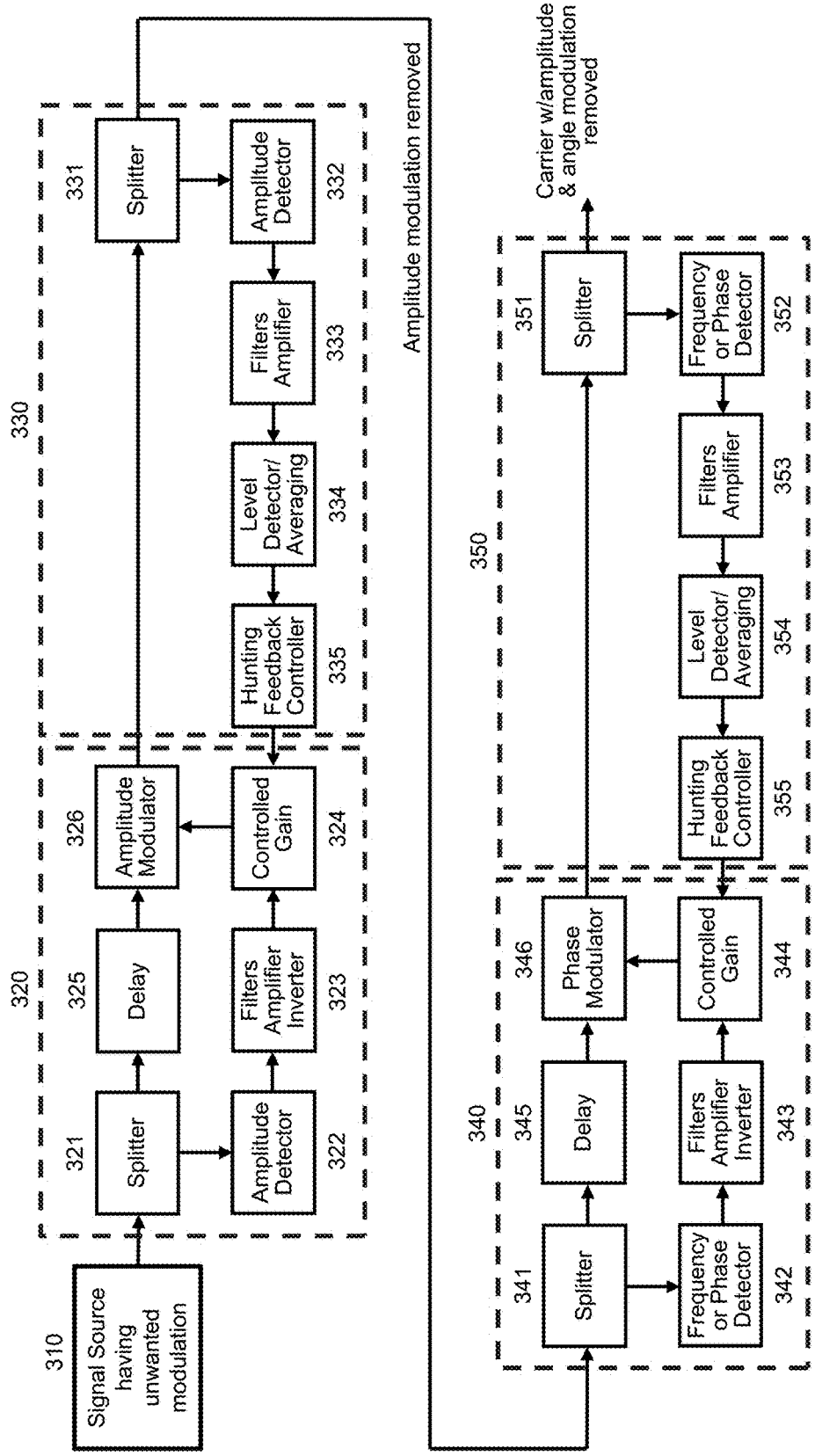
FIG. 3 illustrates an alternate embodiment for signal cancellation of amplitude and angle modulation noise using feedforward and feedback topologies, and including cancellation optimization.

This Description and the Drawings constitute a Disclosure for signal cancellation of amplitude/angle modulation noise using feedforward and feedback topologies, including example embodiments that illustrate various technical features and advantages.

In brief overview, a method for cancellation of amplitude modulation noise using feedforward or feedback topologies.

The method is adaptable to cancel amplitude modulation noise (contamination) of an input signal, including: receiving an input signal including an amplitude modulation noise signal; demodulating the amplitude modulation noise signal to generate a baseband amplitude modulation noise signal; signal processing the baseband amplitude modulation noise signal to generate a amplitude re-modulation signal; and re-modulating the input signal based on the amplitude re-modulation signal to generate an output signal, the output signal having less amplitude modulation noise than the input signal. In a feedforward embodiment, the methodology includes: signal processing the baseband amplitude modulation noise signal based on signal inversion to generate the amplitude re-modulation signal; and feeding forward the amplitude re-modulation signal to re-modulate the amplitude re-modulation signal with the input signal. In a feedback embodiment, the methodology includes: receiving the input signal in a gain controlled amplifier, generating a gain-controlled output signal; detecting the amplitude of the amplitude noise modulation signal in the gain-controlled output signal to generate a feedback amplitude noise signal; integrating the feedback amplitude noise signal to generate a gain control signal; and adjusting the gain controlled amplifier based on the gain control signal, such that the gain-controlled output signal has less amplitude modulation noise than the input signal.

Thus, in general the methodology for signal cancellation of amplitude/angle modulation noise using feedforward and feedback topologies can be used to achieve cancellation of amplitude noise and/or phase noise, period jitter, deterministic spectral components, and other types of amplitude and/or angle noise by processing a source signal after the source signal has been generated. The technique generally involves demodulating the source signal's amplitude/phase noise to baseband, processing the baseband signal (such as by inversion), and using the processed baseband signal to amplitude/angle modulate (re-modulate) the source signal to cancel the amplitude/phase noise. That is, amplitude/angle noise is treated as a modulation signal that can be demodulated to baseband and after processing (such as inversion) used to cancel what is referred to in this Disclosure as "modulation noise" through re-modulation. Embodiments use feedforward and feedback topologies for signal processing and modulation noise cancellation. This technique, when applied to and/or further integrated with PLL synthesizers or other signal sources, can substantially reduce amplitude and/or angle noise (phase noise and period jitter), even for sources that provide narrow channel spacing and/or rapid channel switching.

Effectively, the methodology for signal cancellation of amplitude/angle modulation noise can be used to remove from a signal source unwanted amplitude and/or angle modulation (contamination), such as to obtain a monochromatic carrier with no sidebands. As used in this Disclosure, modulation noise cancellation means the reduction to design specification of unwanted modulation or contamination of the signal source.

FIG. 1 illustrates an example block circuit (architecture) embodiment implementing signal cancellation of amplitude modulation noise using a feedforward topology according to this Disclosure. Block 101 represents any signal source, such as a local oscillator or timing generator, for which the cancellation of amplitude modulation noise is desired.

Splitter 102 delivers the original signal to amplitude modulator 103 and to AM detector 104. AM detector 104 effectively demodulates AM modulation noise to baseband. In Block 105, the baseband signal, which consists of the demodulated AM modulation noise present on the carrier from Block 101, is amplified and filtered (signal processed). Specifically, for this feedforward embodiment, Block 105 amplifies and inverts the baseband AM modulation noise so that the modulation input to amplitude modulator 103 is out-of-phase with the modulation present on the carrier coming to it from splitter 102. Amplitude modulator 103 includes means to adjust the modulation percentage to equal that of the modulation present on carrier coming to it from splitter 102. Amplitude modulator 103 also includes means to adjust timing to insure that the AM modulation noise from Block 105 is completely out of phase with the modulation present on carrier coming to it from splitter 102. The relevant phase angle is that of the modulating signal, not the RF carrier.

Notice that the accuracy of cancellation also could depend upon how well matched are the AM detector and AM modulator curves. It should be understood that for most applications, the amount of AM present on the carrier—the modulation percentage—is very small. Therefore, the AC component from the modulation is easily confined to the linear portion of the detector curve, avoiding its logarithmic, square-law, and exponential segments. Under these conditions, the modulator could also be operated within the linear portion of its curve. For some applications, at least some of the modulation noise can be intentional and/or have a large modulation index. In that case, a soft limiter having low current drain, if needed, could be included as shown in FIG. 1 in order to reduce the modulation percentage. If a limiter is not used, such large modulation could result in the signal not being confined to the linear portion of the detector curve. In that case, the modulator could be designed with a compensating mirroring transfer function. In lieu of matching detector and modulator curves, the modulator could be operated in its linear range, and the baseband feedforward path could include suitable linearization circuitry.

FIG. 2 illustrates an example block circuit embodiment implementing signal cancellation of amplitude and angle modulation noise using a feedforward topology according to this Disclosure. In this example embodiment, the source to be cleaned 210 represents any suitable structure that provides a signal needing reduction of amplitude and/or angle modulation noise. The source could have any carrier frequency, and its existing modulation noise could be unintentional, or originally intentional but now unwanted.

Section 220 repeats FIG. 1, except for the addition of summary Cancellation Optimization Block 225 that adjusts signal delay and modulation percentage of modulator 222 to minimize its output modulation level. AM Detector 223 could be any type of AM detector (including, for some applications, an envelope detector) that does not respond to angle modulation.

Section 230 acts to cancel angle modulation as described in detail in U.S. Pat. No. 8,750,441-B2. Cancelation Optimization Block 237 has a similar function to Block 225. Block 233 can be a FM or PM detector, and, depending upon detector design, a phase reference oscillator 236 can be used. Also depending upon the design of FM/AM detector 233, the design of phase modulator 232, and the spectrum of modulation to be removed, the characteristics of amplifier 234 and processor 235 are determined. For example, if detector 233 is configured as an FM detector and Block 232 is a phase modulator, processor 235 can include a de-emphasis network.

FIG. 3 illustrates an example alternate block circuit embodiment implementing signal cancellation of amplitude and angle modulation noise using a feedforward topology according to this Disclosure, including more detail for the Cancellation Optimization Blocks shown in FIG. 2, which are illustrated in FIG. 3 as Sections 330 and 350.

Block 310 represents a signal source for which reduction or elimination of modulation noise is desired. Sections 320 and 330 are configured to cancel amplitude modulation noise present in monochromatic and other signal sources. Sections 340 and 350 are configured to cancel angle modulation noise, as described in U.S. Pat. No. 8,750,441-B2.

In Section 320, Splitter 321 is a fanout device that delivers the Source signal to two separate circuit blocks, including AM detector 322. Splitter 321 can be active or passive. AM Detector 322 (which can, for certain applications, be an envelope detector) delivers baseband analog of the AM envelope present on the carrier signal from splitter 321. This includes all AM modulation noise—discrete and distributed spectrum, random noise, spurious spectral components, parasitic oscillation, intentional or otherwise. This detector can operate with no local oscillator, but optionally depending on design and application can include a local oscillator. It will respond only to amplitude, not angle modulation. One of its key specifications could be low noise figure. As the carrier level is large and the modulation percentage is generally very small, in the time domain, the output appears to be a DC level with low level noise and other waveforms riding on it. Under these conditions this composite signal can be within the linear range of the detector. The detector output can be AC coupled, to pass the detected AM modulation noise, and disregard the detected carrier level.

Block 323 includes filters to remove vestiges of the carrier frequency energy and define the baseband AM modulation noise spectrum, with feedforward AM modulation noise signal inversion. Block 323 can be configured with single or multiple pass-bands, wide or narrow pass-bands, depending partially upon whether the main goal is to remove broadband AM modulation noise, or specific narrow band spectral components.

The amplifier within Block 323, preferably with low noise figure, amplifies the normally weak AC signal from Block 322 to a level suitable to drive Block 324. The inverter causes the modulating signal to be 180 degrees out of phase with the AM modulation noise signal in order to achieve cancellation of AM contamination. This inversion needs to be on a net basis, and can be contained in any or all of the blocks 322, 323, 324 and 326.

Controlled Gain block 324 has an amplification factor that is determined by the level on its Control Input fed by Block 335. Gain is controlled to provide the signal level to modulator 326 that causes cancellation of the AM on the carrier coming from Splitter 321. Gain can be controlled slowly compared with modulation, signal conditions, such as relative gain of the two signal paths, change slowly.

Section 320 from Block 321 through 322, 323, and 324 to 326 is designed to minimize the relative delay with respect to the path that is not demodulated, including Delay 325, which is employed only when needed. The objective is for this differential delay to be small compared with the delay associated with a small phase angle at the highest relevant modulating frequency, in order that the modulation occurring in 326 is 180 degrees out of phase with the modulation of the demodulated noise, without the need to adjust this relative delay, along with amplitude, automatically. It should be understood that the relevant delays and phase shifts pertain to the modulating signal, not the RF signal.

Amplitude Modulator 326 can be a voltage or current-controlled amplification stage. It controls the peak-to-peak value of the (normally RF) signal coming from Splitter 321, in accordance with the instantaneous value of the baseband signal. This is similar to the operation of Controlled Gain Stage 324, controlled by the Cancellation Optimization circuitry 330, which amplitude modulates the baseband signal, slowly as needed to obtain the correct modulating signal amplitude to obtain the maximum amount of AM modulation noise cancellation. Depending upon the design of Amplitude Modulator 326, which could have a means to adjust its modulation gain, Block 324 could be unnecessary. The objective in either case is to apply the correct amount of out-of-phase amplitude modulation to obtain maximum cancellation of AM modulation noise.

Section 330 illustrates exemplary feedback measurement and proportional control circuitry to maintain complete or maximum cancellation of the AM modulation noise for the signal passing through Splitter 321. Splitter 331 functions similarly to that of Splitter 321. AM Detector 332 functions similarly to that of AM Detector 322. Filters/Amplifier Block 333 functions similarly to that of 323, except that an inverter may not be needed.

Block 334 includes an AM detector that registers the baseband signal amplitude as a varying DC level. If the DC level is zero, AM modulation noise cancellation is accomplished, and no gain adjustment is made. There is also an averaging device, such as a time constant circuit, to smooth the instantaneous variations of the baseband signal.

Hunting Feedback Controller 335 uses the voltage level coming from Level Detector 334 to adjust the gain of Controlled Gain Stage 324. Block 335 can be an integrator preceded by a programmable polarity input. If the integrator sees zero volts at its input, indicating AM modulation noise cancellation, its output level is frozen. If the integrator sees a non-zero voltage at its input, its output voltage slews in one direction or the other at a time rate depending upon the absolute value of its input voltage and with direction depending upon the polarity of its input voltage. For the example AM detector used in Block 332, there is only a uni-polarity signal entering Block 335, so that any finite voltage provides no instantaneous information as to whether the cancelling signal entering Amplitude Modulator 326 is too small or too large. Such polarity information can be recoverable if a synchronous AM detector is used in Block 332—however synchronous AM detection is more complicated, generally including a local oscillator with its noise contamination issues. Therefore, the example Hunting Feedback Controller 335 also measures the polarity of the derivative of the signal from Level Detector 334, and appropriately toggles the programmable polarity circuit prior to integration, as necessary to determine whether cancellation should be increased or decreased. There could also be a voltage comparator at the input of Controller 335 to freeze the integrator output when the voltage from 334 is below a certain absolute value, representative of adequate AM modulation noise cancellation.

Note that Section 330 operates slowly as it compensates for changes of component characteristics, such as gain as a function of temperature.

Sections 340 and 350 illustrate an example embodiment of block circuitry implementing signal cancellation of angle modulation noise present in monochromatic and other signal sources. It operates by a similar method as Sections 320 and 330, except that Blocks 342 and 352 are angle modulation demodulators instead of amplitude modulation demodulators and Block 346 is a phase modulator instead of amplitude modulator.

Section 340 illustrates an example block circuit embodiment implementing angle modulation cancellation as described in U.S. Pat. No. 8,750,441. Filter/Amplifier/Inverter Block 343 is similar in design to Block 323 but will include an equalizer if Block 342 contains an FM instead of phase detector. Frequency or Phase Detector Blocks 342 and 352 contain any type of angle modulation detectors, but for many applications, preferably ones using no local oscillators.

Figure 4:
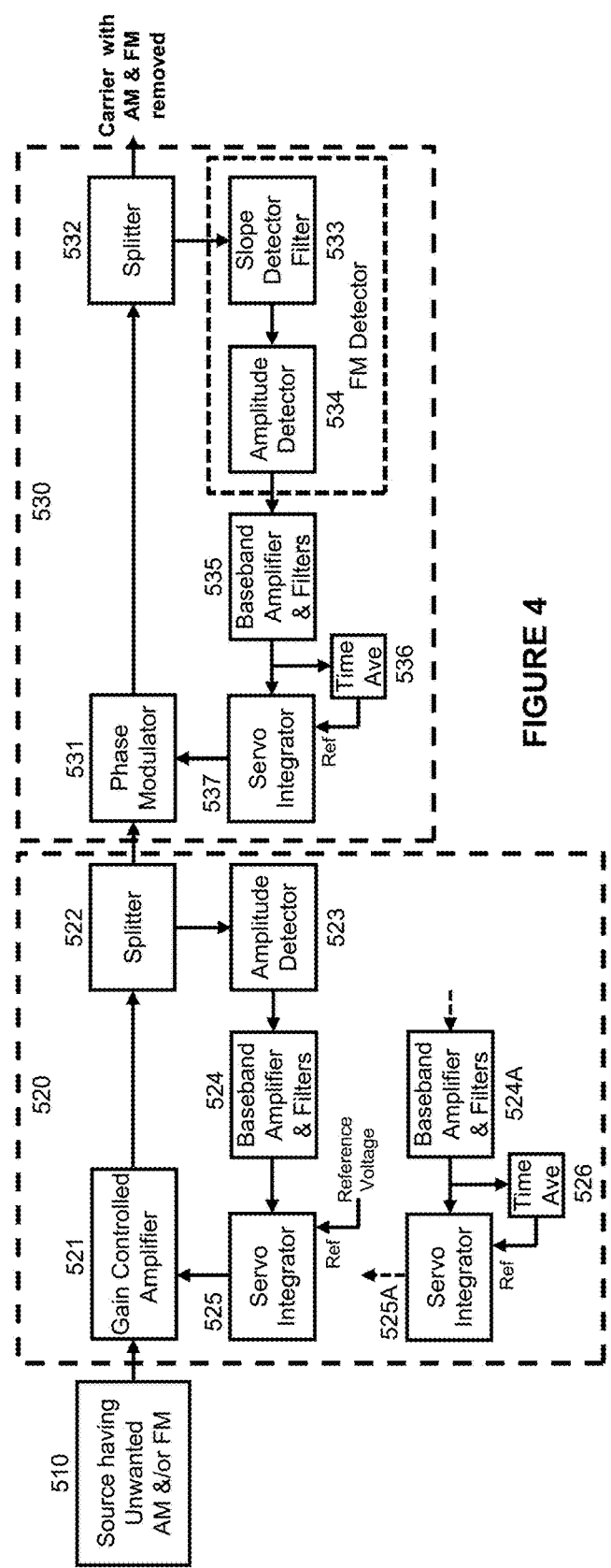
FIG. 4 illustrates an alternate embodiment for signal cancellation of amplitude and angle modulation noise using a feedback topology.

FIG. 4 illustrates example alternate embodiment of block circuitry implementing signal cancellation of amplitude and angle modulation noise, which uses feedback instead of feedforward topology. Similar to previous embodiments, in this example amplitude modulation is cancelled first, in Section 520, then angle modulation, in Section 530. Either or both of the modulation removal topologies can perform adequately under certain conditions. Feedforward and feedback modules could be mixed and matched in various architectures; for instance, a feedback AM removal module can be used with a feedforward FM removal module.

The feedforward and feedback topologies have various advantages and disadvantages. The feedforward arrangement has relatively little high frequency restriction on the modulation being removed, whereas for the feedback method, the highest modulating frequency is limited by the time delay between input of the servo integrator, through the integrator, splitter, envelope detector, baseband amplifier, filters, and back to the servo integrator input. However, the feedback method has two practical advantages over the feedforward method in that it does not require: (a) the auxiliary Cancellation Optimization controllers (FIG. 2, Blocks 225 and 237; FIG. 3, Sections 330 and 350); and (b) matching the transfer functions between demodulators and modulators or employ linearization circuitry within the baseband block when the amplitude modulation percentage is high, or for the angle modulation case, when the detector curve is not linear over its entire necessary range.

FIG. 4 Block 510 represents any type of monochromatic signal source or previously modulated source, for which there is intent to remove modulation noise. The amplitude of Source 510 should be as large as practical in order to facilitate detection by Sections 520 and 530 of unwanted amplitude and angle modulation to a low relative level.

Section 520 shows an example means to remove amplitude modulation noise using feedback control. The mechanism is an AC or DC coupled, fast automatic gain control ("AGC").

An AGC can be used to regulate the carrier level at the AM detector input, so this detector operates at the most advantageous portion of its transfer curve to process the modulation with minimum distortion and maximum dynamic range. Its servo integrator or other controller, by the correct setting of its reference voltage, delivers whatever gain control voltage or current to a gain-controlled amplifier that is necessary to maintain this desired AM detector input level, regardless of the input signal level over a very wide range. In some instances, the gain-controlled amplifier is preceded by the front end of a radio receiver that could be required to compensate for some 100 dB of input signal fading or other unknown level. Moreover, the voltage or current drive to the gain controlled amplifier is normally proportional to the logarithm of the signal level at the front end, thus providing a convenient scale that is linear in decibels. a linear-to-logarithmic converter can be used this architecture as well. Another use for this architecture is to set the carrier output level of laboratory signal generators, and for this application the AGC function is sometimes referred to as automatic level control (ALC).

One design goal of a typical AGC is to set the servo integrator or other feedback controller time constant to be fast enough to keep the AM detector input level constant under the most rapid expected front end signal level variations but slow enough to preserve the modulation at the lowest modulating frequency of interest. In contrast, for the AGC in Section 520, the servo integrator time constant is deliberately short in order to suppress the amplitude modulation, in this case undesired, of the carrier signal at the input of the gain-controlled amplifier. The servo integrator time constant needs to be small enough to suppress modulation up to the highest sideband frequency that exists with the Source 510 carrier, and that is relevant for the application.

Gain Controlled Amplifier 521 represents any circuitry that is capable of varying its amplification factor over a sufficiently wide range to cover signal levels at its signal input. The amplification factor is controlled by a voltage or current level applied to its control input. Splitter 522 distributes the signal present at its input simultaneously to AM Detector 523 and Phase Modulator located 531 in the angle modulation cancellation Section 530.

In the feedback loop, AM Detector 523 represents any type of AM detector (including an envelope detector) that does not simultaneously demodulate angle modulation. It delivers a DC or baseband voltage that is a direct function of the quasi-instantaneous peak-to-peak value of the signal emerging from Splitter 522, including carrier level and all amplitude modulation. Block 523 could be an AM detector as shown or any system that demodulates AM, including an entire AM receiver. In the time domain, its output is a varying DC level, preferably within the detector's linear range, with any residual AC component representing residual modulation present on the carrier. This residual modulation would include spectral components that may not fall within the passband of Baseband Amplifier and Filters Block 524.

Block 524 removes vestiges of all frequencies above all the relevant modulating frequencies and provides any needed amplification, while assisting to preserve baseband noise figure. Servo Integrator 525 (or other suitable feedback controller) acts to slew its output voltage or current to whatever value is necessary to maintain its variable input level to equal its reference voltage input level. Its general slewing speed is inversely proportional to its time constant and directly proportional to the instantaneous difference of its input voltages. It functions as a proportional controller.

When the AGC loop of Section 520 operates in the Direct Coupled mode, the loop demands a particular RF level coming from Splitter 522 at all times. That particular level is determined by the reference voltage connected to the reference input to Servo Integrator 525. In this case, it is the carrier level delivered by Splitter 521 that is specifically maintained, but all modulation, from DC to the loop cutoff frequency, as determined by Servo Integrator 525 time constant, is suppressed. Servo integrator 525 time constant should be longer than the signal circulation time, in order for the AGC loop to be stable.

The salient purpose for AGC Section 520 is not to regulate the carrier level, but to suppress AM modulation noise. Moreover, suppressing amplitude modulation noise down to DC level may not be useful, because Section 530, which suppresses angle modulation, may not operate successfully at the lowest modulating frequencies if Blocks 533 and 534 constitute an FM detector rather than a phase detector (discussed further below in connection with FIGS. 13 and 14). The lower the modulating frequency, the lower is the frequency modulation deviation for a given amount of phase modulation. Therefore, an FM detector delivers a vanishingly small output signal level. Moreover, a typical Source to be cleaned usually has a constant output power level, so that feedback control of carrier level is not needed.

Using optional 524A, 525A, and Time Averaging 526 Blocks, the AGC loop avoids control of absolute carrier level by referencing the servo integrator to the average signal level, which in most instances, when modulation is symmetrical above and below carrier level, is the signal carrier level. By increasing the time constant of Time Averaging circuit 526, modulation down to a lower frequency is suppressed. The AGC loop can also abandon control of absolute carrier level in order to concentrate on suppression of modulation by AC coupling at the AM Detector 523 output. Additional, low noise, amplifier gain in Block 524 could assist with preserving the waveform of low-level amplitude modulation present in Source 510, down to where AM detector internal noise becomes significant.

Alternatively, Block 524 could be AC coupled, in order to disregard the irrelevant carrier level and allow large low noise figure amplification of the AC component that represents the normally low level modulation being suppressed. When the AGC loop of Section 520 operates in the AC coupled mode, Servo Integrator 525 delivers a waveform to Gain Controlled Amplifier 521 that causes the waveform it receives from Block 524 to equal its average level at all times. Its reference voltage is set to be equal to this average level. The alternative Blocks 524A, 525A, and 526 automatically find the average level of the AC signal representing unwanted amplitude modulation noise that rides on the DC level delivered by AM Detector 523. Block 524A receives an AC coupled signal from Detector 523.

For most applications, Source 510 does not have a highly variable or uncontrolled carrier level. Rather, the carrier level is essentially constant. Moreover, for many applications, the modulation noise being suppressed has a very small modulation index—otherwise known as modulation percentage. Therefore, Gain Controlled Amplifier 521 needs to vary its gain, as determined by the voltage or current delivered by Servo Integrator 525 or 525A, over a narrow range. As such, Gain Controlled Amplifier 521 could actually use the circuitry of an amplitude modulator, which has a linear transfer function instead of a logarithmic transfer function, which could improve servo loop characteristics.

Block 530 is an example feedback means to remove angle modulation noise (phase/frequency), comprising circuitry similar to an AC coupled, fast automatic frequency control ("AFC"). It receives an angle-modulated carrier from either Section 520 or directly (not shown) from Block 510. It does not change the frequency of this carrier, except for short-term variations within the modulation bandwidth. The incoming carrier could have a stable average frequency or could be drifting. The incoming carrier could be confined to a single frequency channel or exist on various channels at various times.

Section 530 depicts an AFC system that is not intended to regulate the long-term carrier frequency or to provide channel frequency long-term stability. It is intended, rather, to find the carrier frequency or average frequency relative to unwanted angle modulation noise present on the carrier, which is assumed to have an average value that changes slowly compared with the lowest modulating frequency component. It finds this average frequency by using a suitable frequency to voltage converter (FM detector) or phase detector with reference, and employing a time constant filter. It then compares this average voltage with the instantaneous voltage and rapidly adjusts a device to angle modulate the carrier from Section 520 having unwanted modulation noise with equal and opposite modulation. This cancellation occurs because the servo element demands that the instantaneous frequency be equal to the average (carrier) frequency.

Phase Modulator 531 receives a carrier signal needing reduction of angle modulation from Section 520 or (not shown) from Block 510. It also receives a modulating signal from Servo Integrator 537 that is 180 degrees out of phase with the angle modulation noise on incoming carrier and having the correct amplitude to cancel this modulation noise. Splitter 532 delivers this clean carrier to the System Output and to an FM Detector, shown in this embodiment as a slope detector consisting of slope filter 533 and AM Detector 534.

This FM Detector can be any suitable means to demodulate angle modulation, such as an FM or phase detector with reference oscillator, or a complete angle modulation receiver. In the present embodiment, this detector consists of Slope Detector Filter 533 and AM Detector 534.

Slope Detector Filter 533 consists of a filter or some other device having a pass band and stop band and a transition band between them. The transition band needs to include the carrier frequency of Source 510, plus all necessary sidebands, plus allowance for frequency tolerance and drift. This transition band could include only a single channel of Source 510 or multiple channels. Such a filter could be any type and function at any frequency based upon conversions from Source 510 frequency. Its output consists of the frequency modulated carrier corresponding to any residual frequency modulation present in Source 510 that is delivered by phase modulator 531. Also present is any residual amplitude modulation noise of the Source 510 carrier not removed by Block 520.

The output signal from Slope Detector Filter 533 is delivered to AM Detector 534, which responds only to amplitude modulation, and then to Baseband Amplifier & Filters 535, which together function similarly to Blocks 523 and 524 in the AM Cancellation Section 520. Baseband Amplifier & Filters Block 535 can include a de-emphasis filter. Likewise, Servo Integrator 537 and Time Averaging device 536 operate similarly to Blocks 525A and 526 in AM Cancellation Section 520. Servo Integrator 537 compares instantaneous with average frequency at Splitter 532 and slews its output, driving Phase Modulator 531 with a waveform that causes it to reduce any frequency difference.

A typical AFC controls the carrier frequency of a source, or intermediate frequency derived from a source, and is fast enough to keep the average carrier frequency constant but slow enough to preserve angle modulation at the lowest modulating frequency of interest. The AFC in FIG. 5 does not control the carrier frequency of the source. Using the small time-constant of the servo integrator, it functions deliberately at a high speed in order to suppress angle modulation noise. The highest modulating frequency that can be canceled is determined by the servo integrator speed and time delay around the feedback loop.

Section 530 can be configured to correct the instantaneous frequency to be equal to the average, carrier frequency, regardless of what that carrier frequency is, as long as it and all relevant modulation sidebands are within range of the slope detector filter. This technique can remove the requirement to track the servo integrator reference set point with the Slope Detector filter 533, AM Detector 534, and Source 510 frequency. However, if there is a requirement to remove angle modulation noise down to extremely low modulating frequencies, it could be advantageous to employ the direct coupled method similar to Servo Integrator 525. In that case, the FM Detector shown in Block 530 can be replaced by a phase detector and reference monochromatic signal source, as phase modulation produces very small amounts of deviation at low modulating frequencies (see Description for FIGS. 13 and 14).

In this embodiment, Section 520 precedes Section 530, because the type of FM detector used in Section 530 performs demodulation of amplitude modulation as well. However, the amplitude demodulator in Section 520 does not demodulate angle modulation. If Section 530 were to use an angle demodulator that does not respond to amplitude modulation noise, Section 520 would not be required.

The feedback topology of Section 530 includes the restriction that modulation noise at high modulating frequencies can be removed only if the loop delay is sufficiently small. In this respect, it is similar in basic theory to PLL and other feedback controlled carrier synthesizers. Operation is effective only inside the loop bandwidth. However, if Section 530 is implemented with a PLL, it can perform a variety of functions, such as preservation of long term frequency stability, desired channel spacing, and switching speed, which act as constraints to loop bandwidth that may not be present with this post generator architecture. The design of Section 530 normally utilizes small delay RF components and specializes only in the removal of unwanted angle modulation noise. Thus, much higher values of loop bandwidth can be supported, with commensurate suppression of much higher unwanted modulation noise frequencies.

The FIG. 4 example feedback topology embodiment uses an FM detector instead of a phase detector to demodulate angle modulation noise. This design choice illustrates that any phase detector needs a reference source that has considerably less angle modulation noise than the source being cleaned, whereas certain categories of FM detectors require no reference oscillator.

The example embodiments in FIGS. 2, 3 and 4 include what can be FM detectors to demodulate angle modulation noise in place of phase detectors and phase reference sources. An FM demodulator, including slope detectors, can be used that does not require a local oscillator. The embodiment in FIG. 4 uses an FM Slope Detector 533. Included in this type of demodulator is a slope detector filter, example implementations of which are described in connection with FIGS. 5A and 11A.

In order to determine the degree of modulation noise suppression attainable using an FM detector, the first step is to relate phase noise ratio density to frequency deviation density, as FM detectors respond explicitly to deviation level. A well-known formula relating these two representations is: $L=20*\log(d/f)-6$, or, solving for d: $d=f*10^{[(L+6)/20]}$. "L" is the single sideband phase noise ratio density in dBc/Hz. "f" is the modulating frequency, offset from the carrier frequency. "d" is the RMS frequency deviation density. The fact that the deviation density is directly proportional to the modulating frequency is significant, indicating that FM detectors are relatively sensitive at high modulating frequencies and relatively insensitive at low modulating frequencies. For example, integrated 2.5 GHz transceiver local oscillators can have 85 dBc/Hz single sideband phase noise ratio density at 1 KHz; so the above formula could be applied at −100 dBc/Hz at this modulating frequency to represent considerable improvement. The formula shows that −85 dBc/Hz at 1 KHz modulating frequency corresponds to an RMS deviation of 0.02 Hz/Sq-Rt Hz bandwidth. The usefulness of this deviation density is determined by the frequency-to-voltage conversion slope of the FM detector. For the example of an FM slope detector, the rate of change of output voltage with input frequency of the slope detector filter is an important parameter.

The next step is to determine whether a slope detector filter would produce the necessary frequency to voltage conversion gain to produce a baseband signal representing existing angle modulation noise that is sufficiently stronger than baseband circuit noise. It is necessary to determine the signal level that will emerge from the filter when the deviation is 0.02 Hz RMS.

A slope detector can be implemented with a film bulk acoustic resonator (FBAR), or a bulk acoustic wave resonator ("BAW"). Vector network analyzer measurements on integrated circuit-packaged BAW dies, having a Q of about 1200 indicate that such a device is useful for demodulation of FM having the above deviation density. Reactance slope of about 88 Ohms/MHz at 2.5 GHz indicates that this device is useful to construct FM detectors, such as Quadrature Detectors, configured to use it. The useful frequency range is about 4 MHz out of about 2.5 GHz. Analysis of the amplitude response data shows that with practical carrier signal levels, slope is about 131 nVolts/Hz deviation. Relating this result to the said example deviation requirements is a signal of 2.616 nV RMS for 0.02 Hz deviation.

Such network analyzer measurements show capabilities of the BAW resonator but not specifically how to apply it in a practical situation. The BAW resonator is extremely small, even on the scale of integrated circuitry but is constructed on a different substrate material than integrated circuitry. Therefore, the BAW die could be applied by mounting it directly on an IC substrate, "stacked die". Connecting it to the integrated circuitry can in some cases be facilitated by low impedance interface.

Figure 5A:
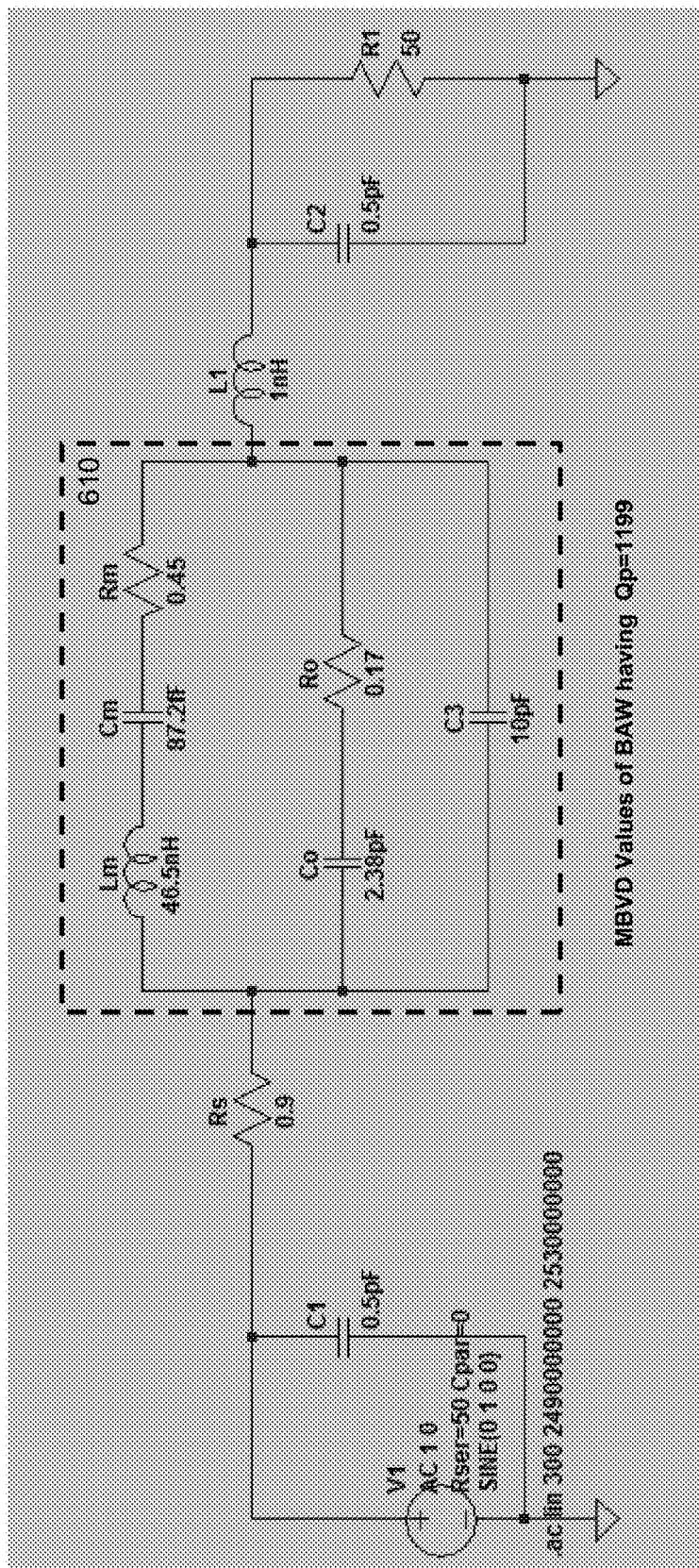
FIGS. 5A/5B illustrates an example embodiment of a BAW topology that resembles an elliptic (Cauer-Chebychev) low pass filter, noted for its sharp transition band.
Figure 5B:
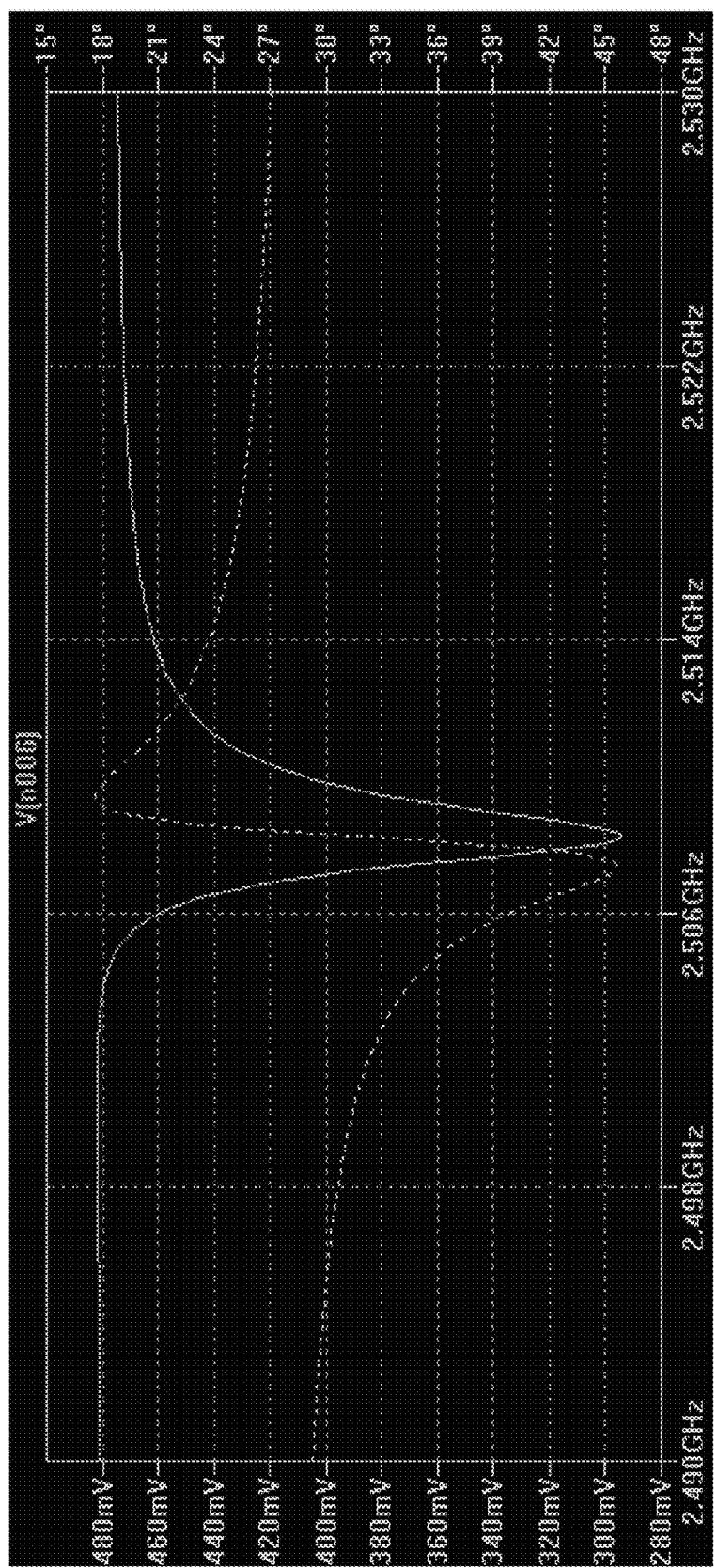

FIGS. 5A/5B illustrates an example embodiment of a BAW topology that resembles an elliptic (Cauer-Chebychev) low pass filter, noted for its sharp transition band. This topology features a 50 Ohm input and output impedance and the ability to shift the transition band frequency by more than 0.5%. The frequency-to-voltage slope obtained, shown in FIG. 5B, assumes a 1 Volt input signal, with this conversion gain being proportional to input signal level. Examination of the amplitude (solid) curve shows that 0.02 Hz frequency deviation results in an output signal level of 2.53 nVolts, which is 18 dB higher than the single sideband thermal noise level, applicable for baseband frequencies high enough that shot noise and/or flicker noise are insignificant. The overall design task using a slope detector is therefore reduced to the low noise design of the AM/envelope detector driven by this circuit when applied as a slope detector filter.

Referring to the schematic details of FIG. 5A, BAW resonator 610 is a mechanical (MEMS) device that has an equivalent electrical circuit similar to a common quartz piezo crystal. Lm, Cm, Rm, C0, and R0 in Block 610 show the equivalent or "sub circuit" values derived from a typical Q=1200 BAW as manufactured. L1 and Rs represent lead wire inductance and resistance. The remaining circuit topology and components were added to achieve the 50 Ohm terminations, simulated response curves shown in FIG. 5B, and ability to vary the value of C3 to cover a wide frequency range using a single resonator. Normally, the negative sloped transition segment is used as the slope detector filter, as it can have a wider linear range or steeper slope, for situations in which maximum frequency to voltage gain is needed. For this design, there is virtually no stop-band; as the component values were optimized for large absolute value slope. In FIG.

5B, the dotted phase curve shows a phase shift increment of 1 degree for each 43.5 KHz frequency shift, indicating that a practical quadrature FM detector could also be constructed. Covering a wider range while maintaining the same slope values can be accomplished using multiple resonators within the same IC package. The FM slope detector can operate on any or all parts of the filter curve that are reasonably linear.

Figure 6A:
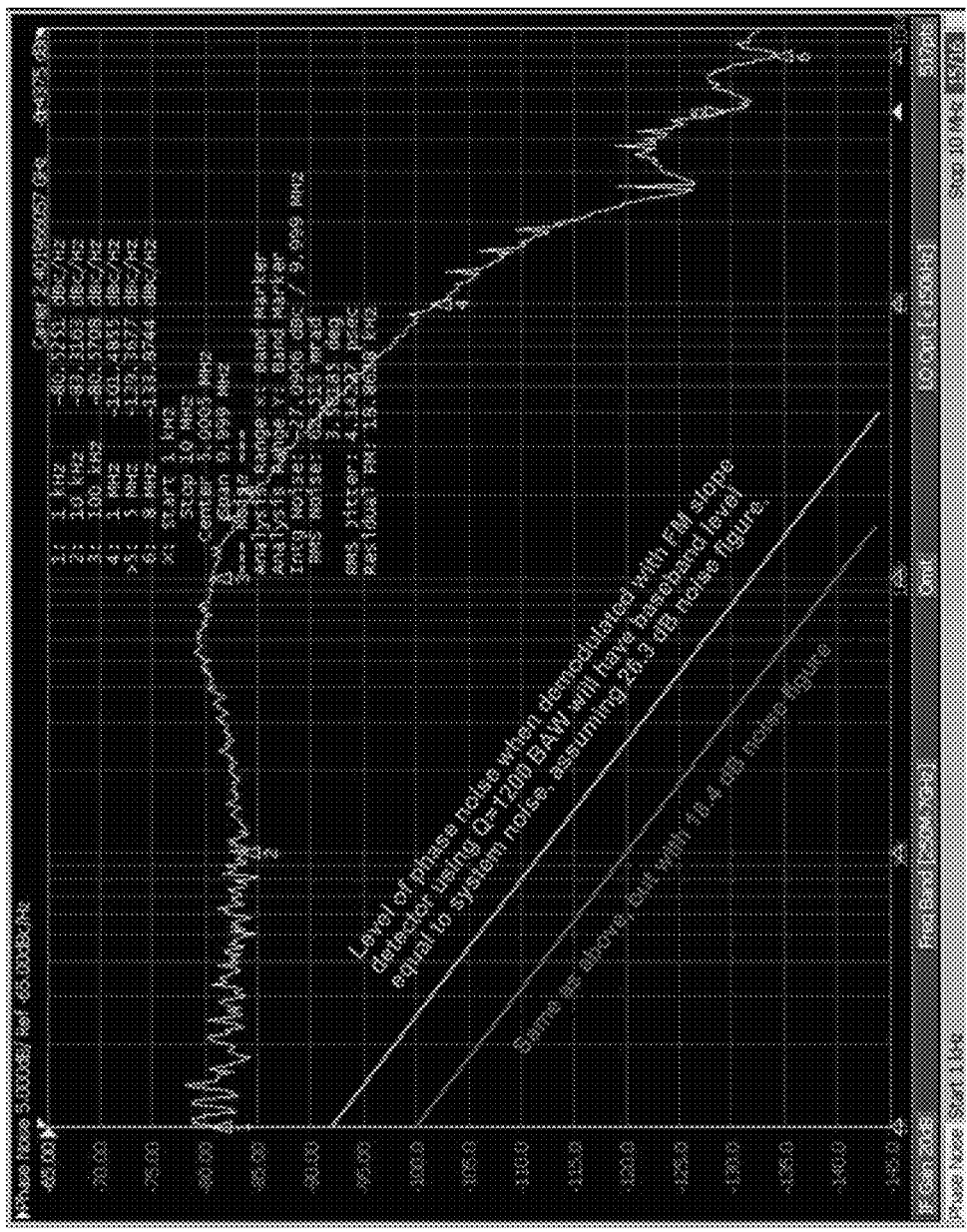
FIGS. 6A and 6B illustrate example phase noise plots for respectively a transceiver and a frequency synthesizer.
Figure 6B:
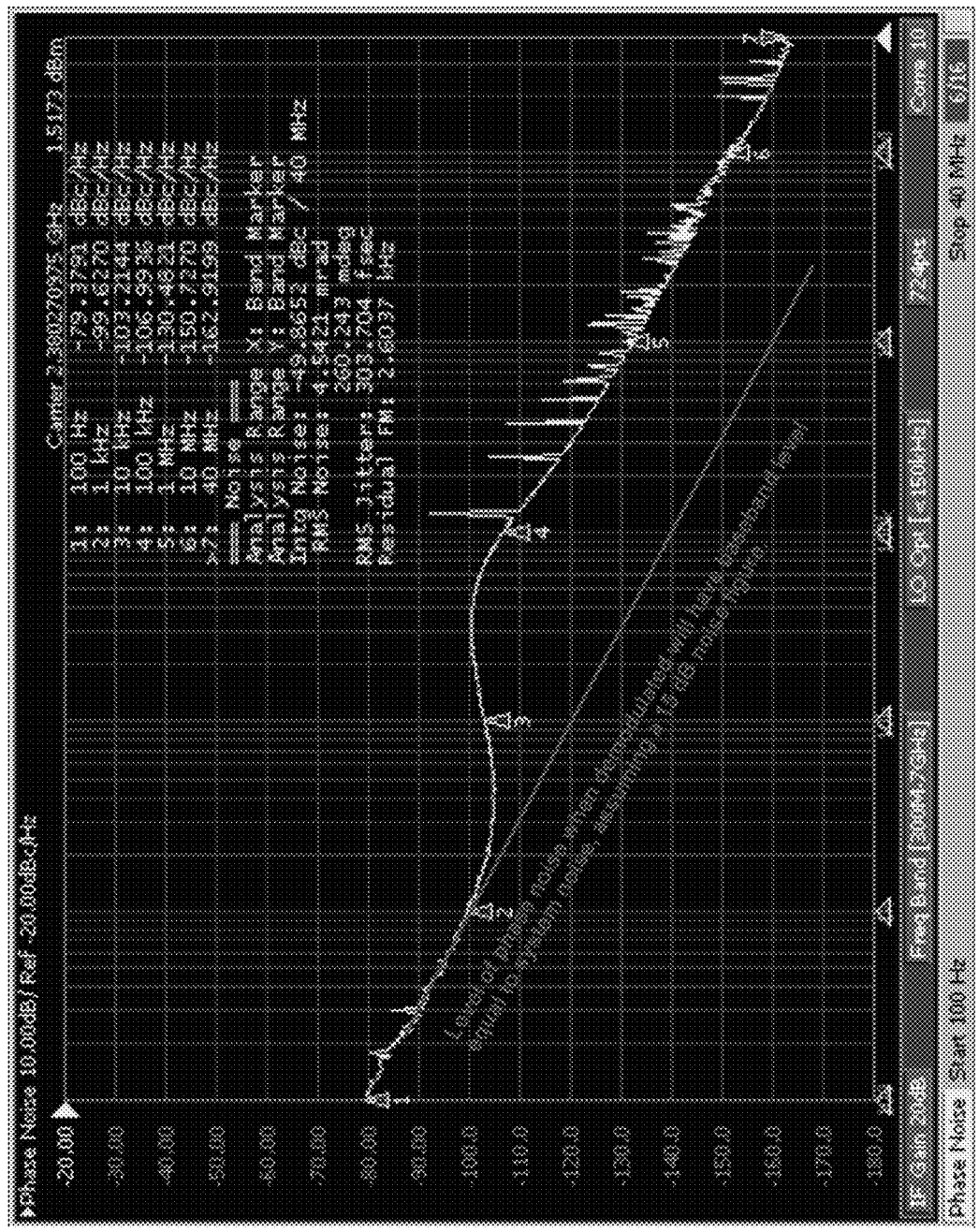

FIGS. 6A and 6B illustrate example phase noise plots for respectively a transceiver and a frequency synthesizer. Superimposed on these plots are estimates of phase noise with the noise cancelation methodology of this Disclosure. The estimates assume 0.05 Hz phase noise deviation instead of 0.02 Hz. The noise figures referred to in the figure are that of the subsystem beginning with the angle modulation detectors in FIGS. 2, 3, and 4.

The Disclosure to this point has concentrated on unwanted continuously distributed or broadband spectral energy modulating a carrier. Cancellation of unwanted Source modulation is achievable down to levels for which the system-circuit noise level is a comparable to or less than that of the demodulated noise-signal.

In addition to canceling modulation noise in the form of continuously distributed or broadband spectral energy, embodiments of circuitry that implement signal cancellation of amplitude and angle modulation noise according to this Disclosure, are also effective in canceling spurious or unwanted discrete spectral components ("Spurs"), deterministic or otherwise. Deterministic spurs are those that exist based upon the design architecture of the Source. PLL reference spurs and fractional N spurs are examples. Non-deterministic spurs usually result from design defects that cause parasitic oscillations under some conditions, such as temperature. For some system requirements, the reduction of spur levels is more important than reduction of broadband phase or other modulation noise. In order to obtain other desirable specifications, such as low phase (or other modulation) noise, fast switching speed, and narrow channel spacing, the design of some monochromatic sources can result in spurs at problematic levels.

Figure 7A:
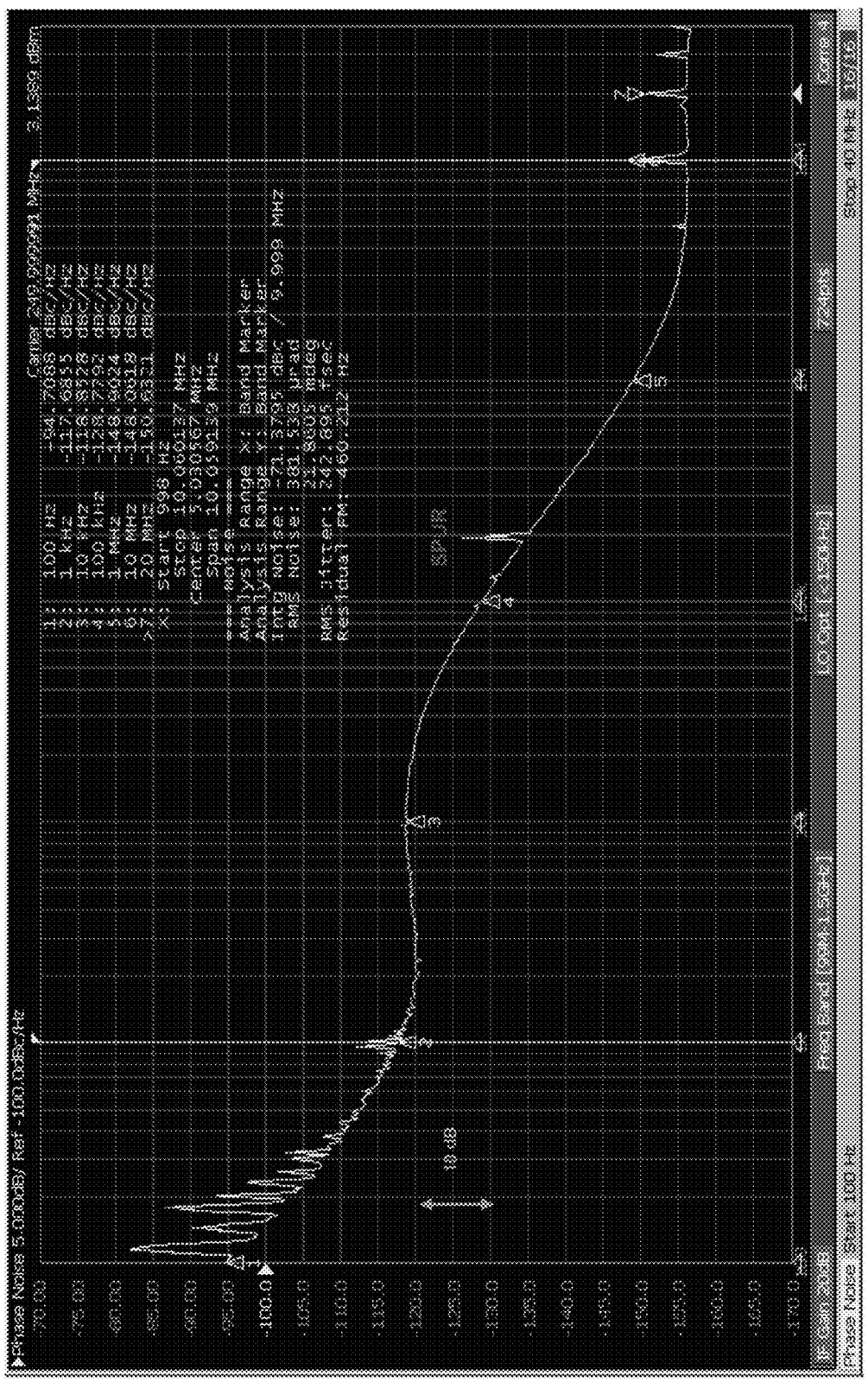
FIGS. 7A-7D illustrate example test results of post generator phase noise and spur reduction.
Figure 7B:
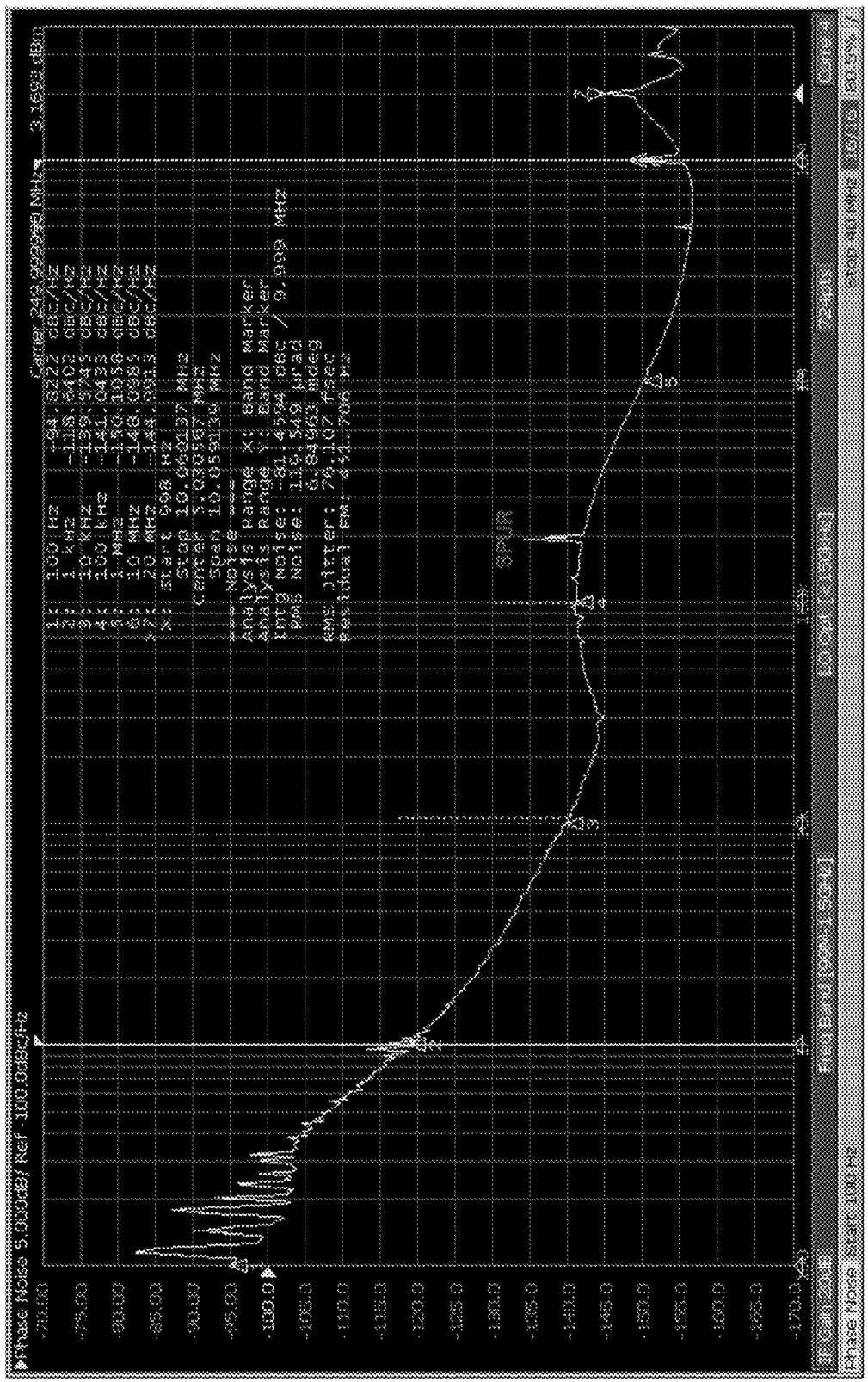
Figure 7C:
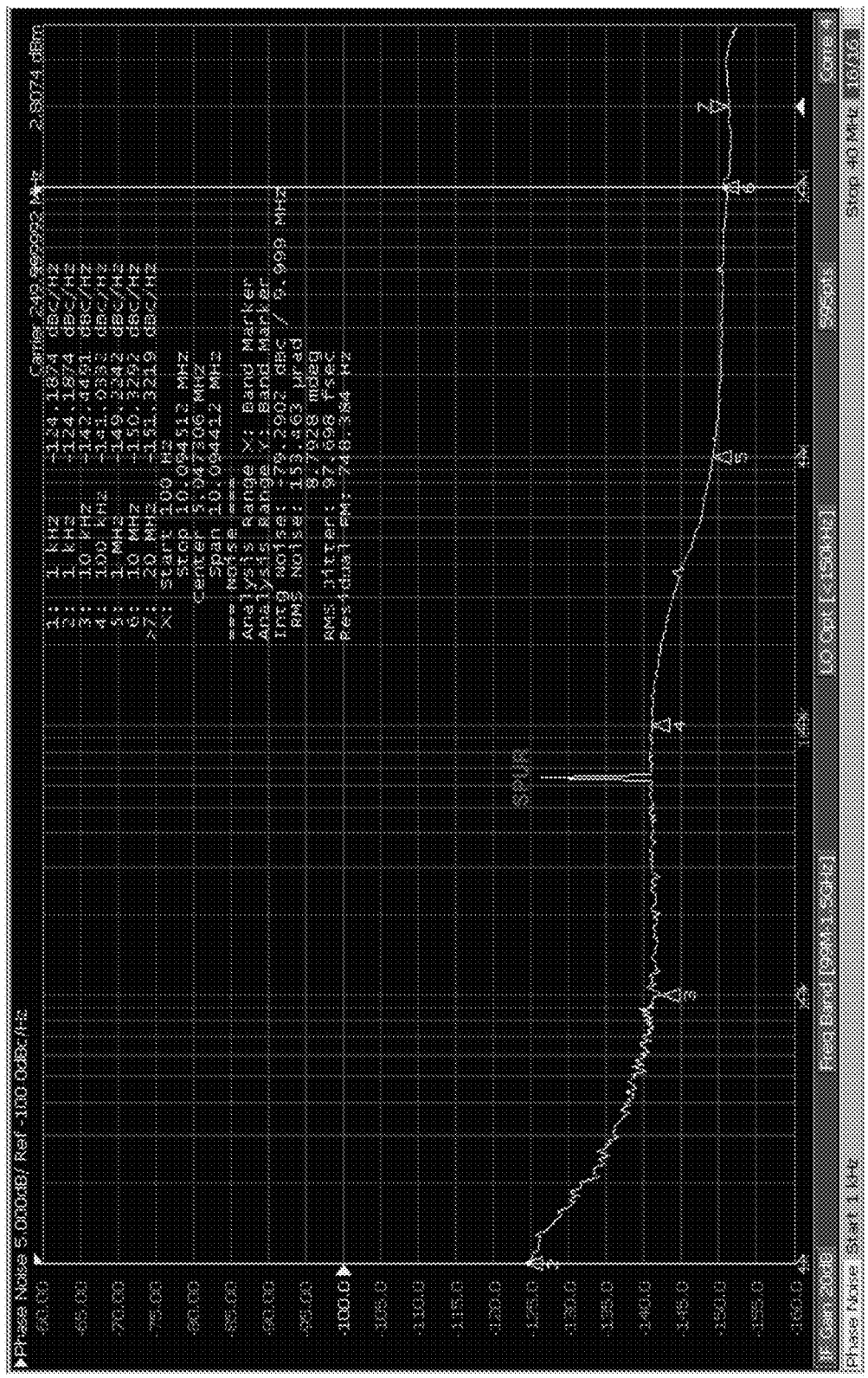
Figure 7D:
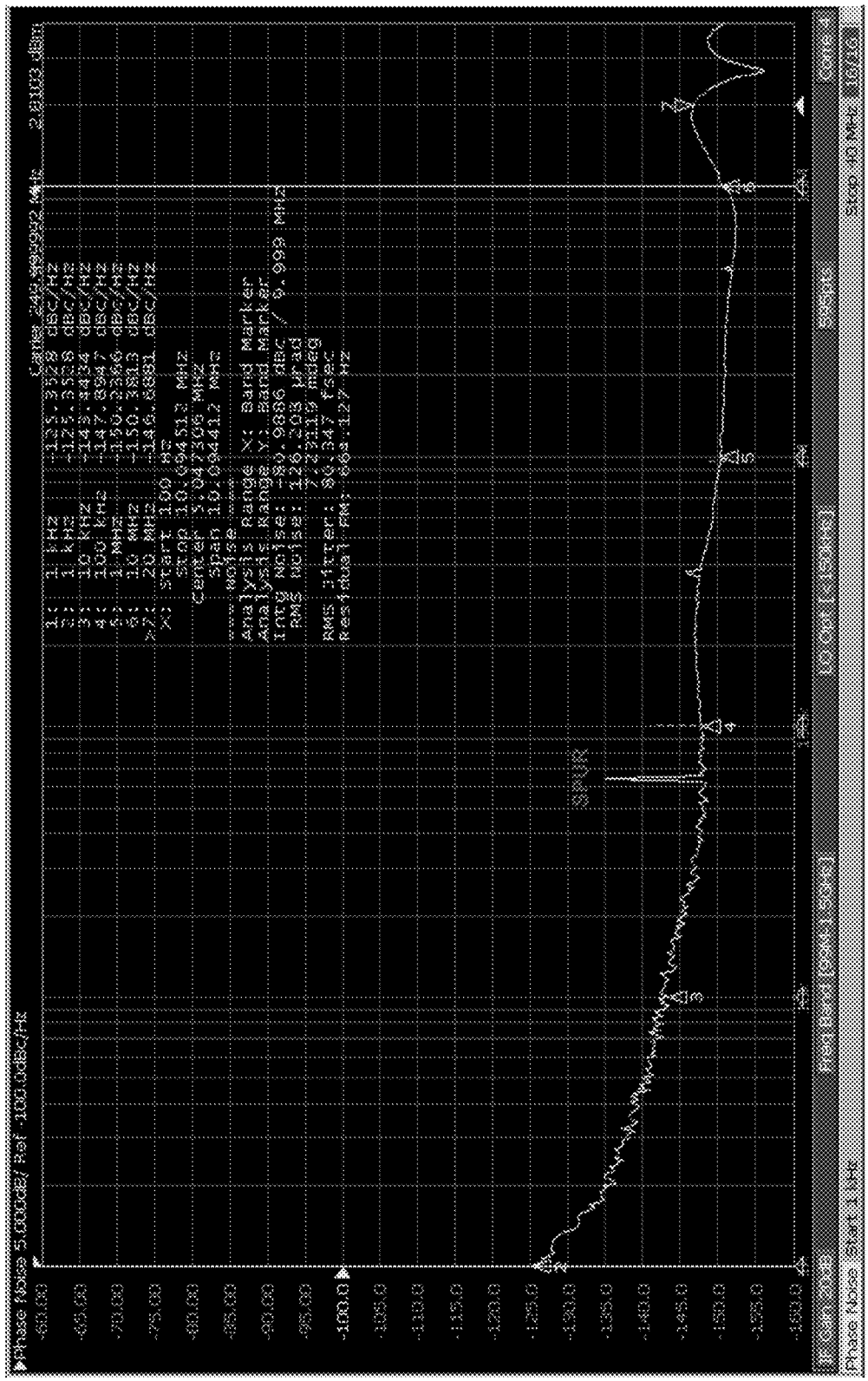

FIGS. 7A-7D illustrate example test results of post generator phase noise and spur reduction. When signal cancellation is employed with flat baseband frequency response, all spectral components at a given modulating frequency are reduced by the same power ratio, based upon system baseband noise level at that frequency. FIGS. 7A and 7C show measurement prior to cancellation, and FIGS. 7B and 7D show measurement after the cancellation process. For these example test results, feedforward cancellation apparatus used a phase detector with an ultra-quiet reference oscillator (for test purposes). For FIGS. 7A/7B, the example source being cleaned consisted of an integrated 10 MHz/step PLL synthesizer with integrated VCO at 1500 MHz, all divided internally by six. The loop filter was purposely not optimized for lowest phase noise. Total Period Jitter, 10 KHz to 10 MHz was initially 243 femto-seconds. A spur at just under 200 KHz modulating frequency was reduced by the same amount as the phase modulation noise at that modulating frequency. Total Period Jitter was reduced to 76 femto-seconds and phase noise ratio density at 10 KHz was reduced from −119 to −140 dBc/Hz. For FIGS. 7C/7D, the example source consisted of a low phase noise bench signal generator outputting at 250 MHz. A spur at about 65 KHz modulating frequency was reduced by the same amount as the phase modulation noise at that modulating frequency. Total Period Jitter was reduced to 80 femto-seconds from 98 femto-seconds, and phase noise ratio density at 100 KHz was reduced from −141 to −149 dBc/Hz. These tests illustrate that if low level phase noise and spurs can be demodulated with a sufficiently high level relative to baseband circuit noise, they can be substantially eliminated using a practical modulator.

For some applications, it can be important to reduce spur levels by a larger amount than can be accomplished with modulation noise and other distributed spectral energy. For some applications, it is only required to reduce the level of spurs by a very large amount, but not necessary to reduce distributed modulation noise. In still other applications, it can be necessary to reduce modulation only at certain modulating frequencies or bands of modulating frequencies.

Figure 8A:
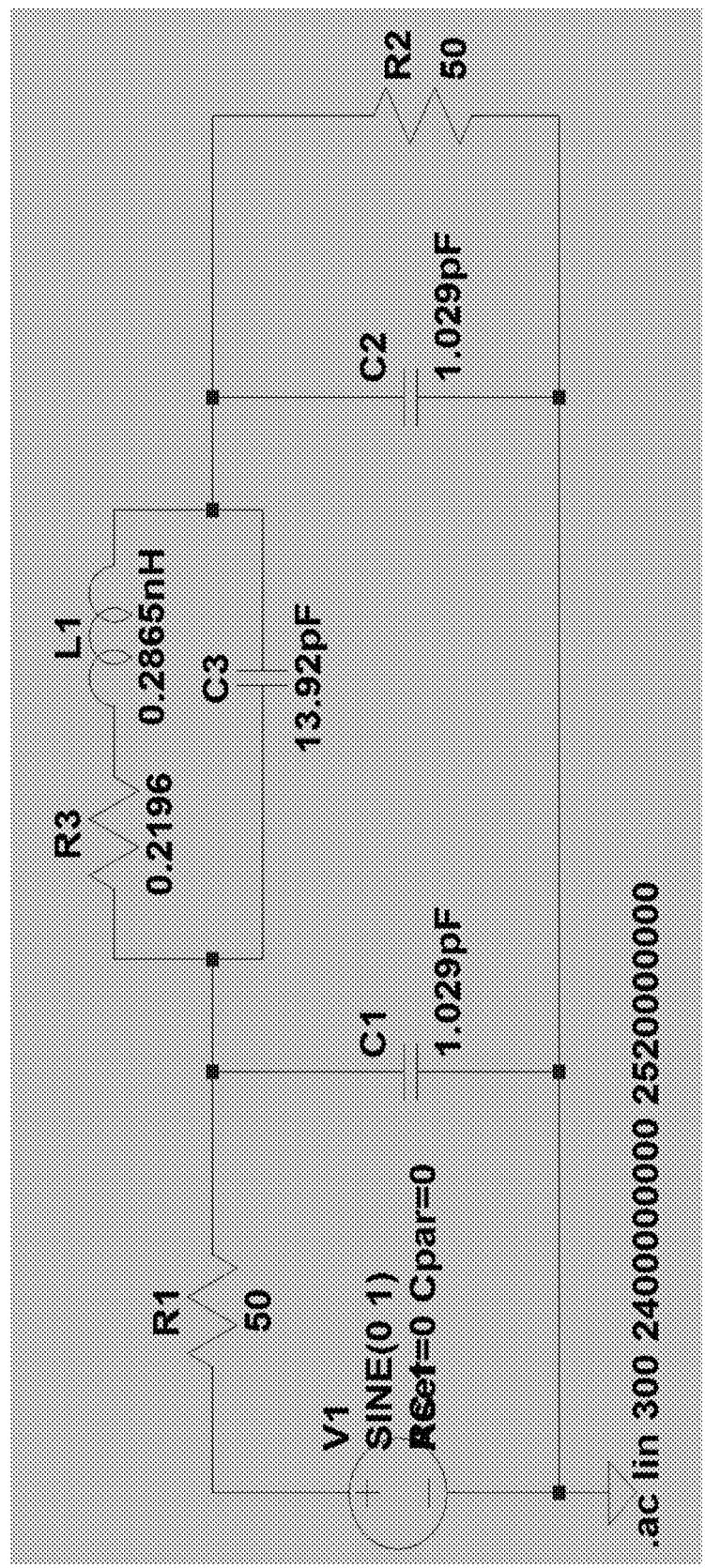
FIGS. 8A/8B illustrate an example embodiment of a 50 Ohm input and output elliptic filter circuit that can be used as a broad band FM Detector slope filter, such as can be used in the embodiment illustrated in FIG. 4.
Figure 8B:
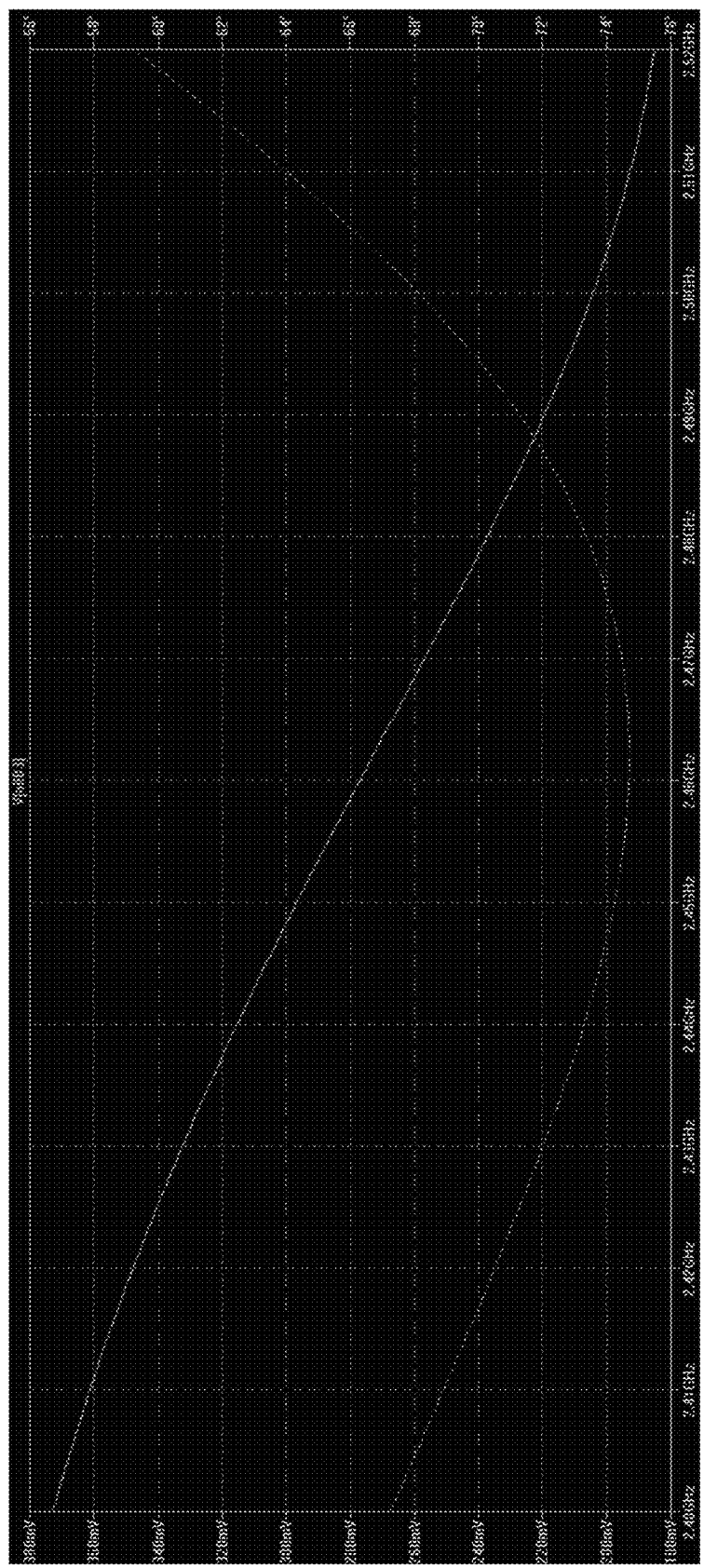

FIGS. 8A/8B illustrate an example embodiment of a 50 Ohm input and output elliptic filter circuit that can be used as a broad band FM Detector slope filter, such as can be used in the embodiment illustrated in FIG. 4. Its Q=20 resonator can be constructed as a coil on a Silicon chip, or by any other suitable manner such as using bonding wires, as with inductors often used for PLLs with integrated VCOs. FIG. 8B illustrates an example plot in which the linear range extends from 2440 MHz to 2480 MHz. With 1 Volt RMS signal drive, the frequency-to-voltage conversion gain is only 4 nV/Hz deviation. This signal is 27 dB smaller than that shown in FIG. 6A for a Q=1200 BAW resonator. Nevertheless, it can be used to remove high modulating frequency contamination, owing to the large deviation/contamination level delivered by FM detectors. If the baseband filter is set to exclude low modulating frequencies, the circuit noise floor is reduced even further. Thus, this filter covers the applications of sources needing low phase noise and/or spurs at modulating frequencies greater than a few MHz.

The example embodiments described in this Disclosure generally use an FM detector instead of a phase detector to demodulate unwanted angle modulation. A phase detector needs a reference source that has considerably less angle modulation noise than the source being cleaned, whereas certain categories of FM detectors require no reference oscillator. FM detectors are extremely efficient at producing baseband output at high modulating frequencies, as a given amount of phase modulation produces frequency deviation directly proportional to modulating frequency. At low modulating frequencies, frequency deviation essentially vanishes; therefore, for unwanted carrier modulation at low enough modulating frequencies and levels to suit certain applications, the output level of an FM detector can be lower than the system noise floor.

In contrast, the rate of change of output voltage with input phase difference for a given phase detector type is independent of modulating frequency. Moreover, existing and tolerable angle modulation levels at low modulating frequencies tend to be higher than at higher frequencies. Therefore, phase detectors produce large baseband signal levels that can exceed system noise density down to very low modulating frequencies.

Therefore, for certain applications, including frequency agile sources, it is advantageous to construct and utilize reference oscillators having sufficiently small angle modulation compared with the Source to be Cleaned. The methodology described below involves heterodyning the Source signal to a very low frequency using a practical PLL synthesizer local oscillator having low phase noise and other unwanted modulation, and demodulating the signal using a continuously frequency agile reference oscillator and phase detector.

Figure 9A:
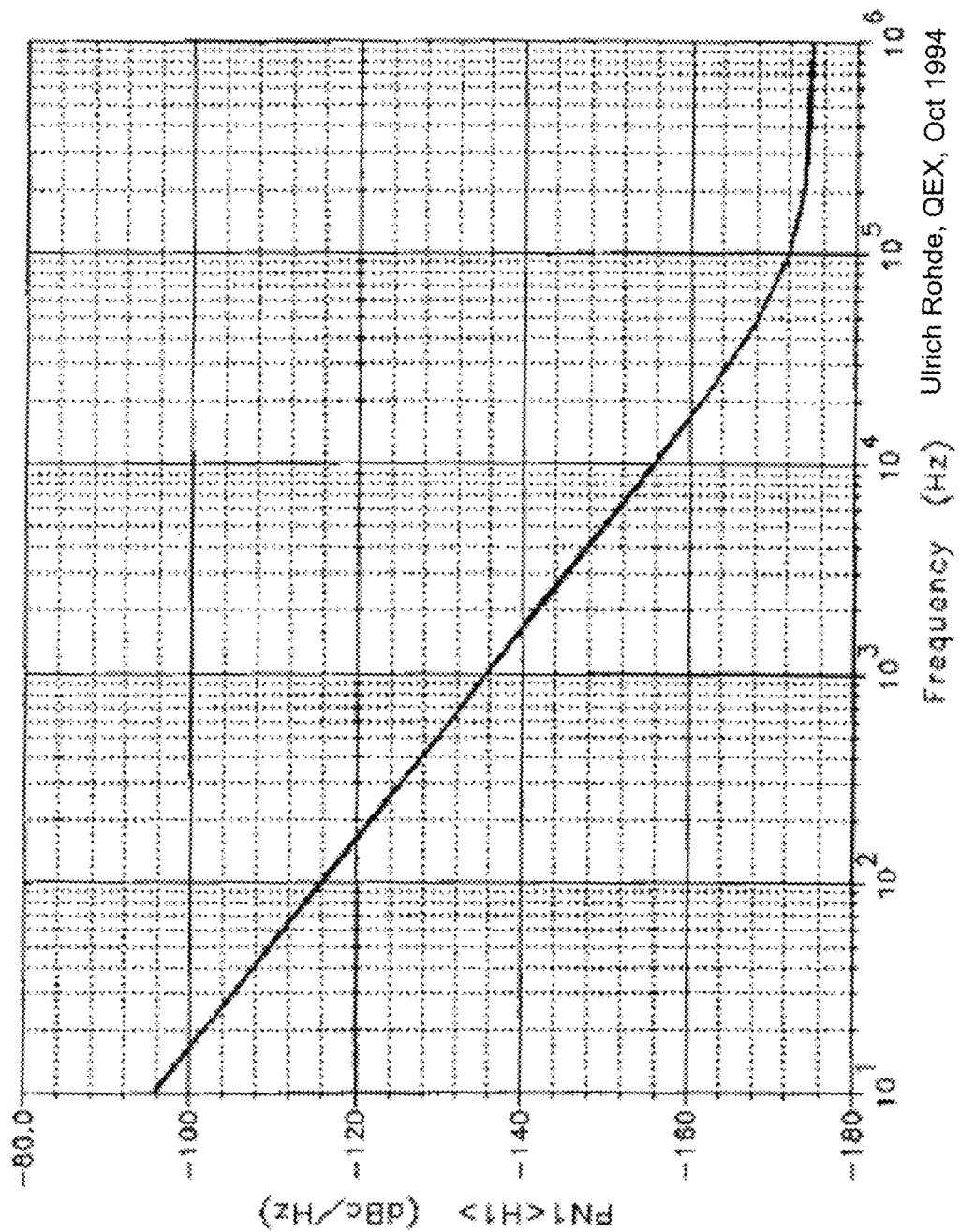
FIGS. 9A/9B provide example phase noise plots for low frequency self-controlled oscillators, that are continuously frequency agile.
Figure 9B:
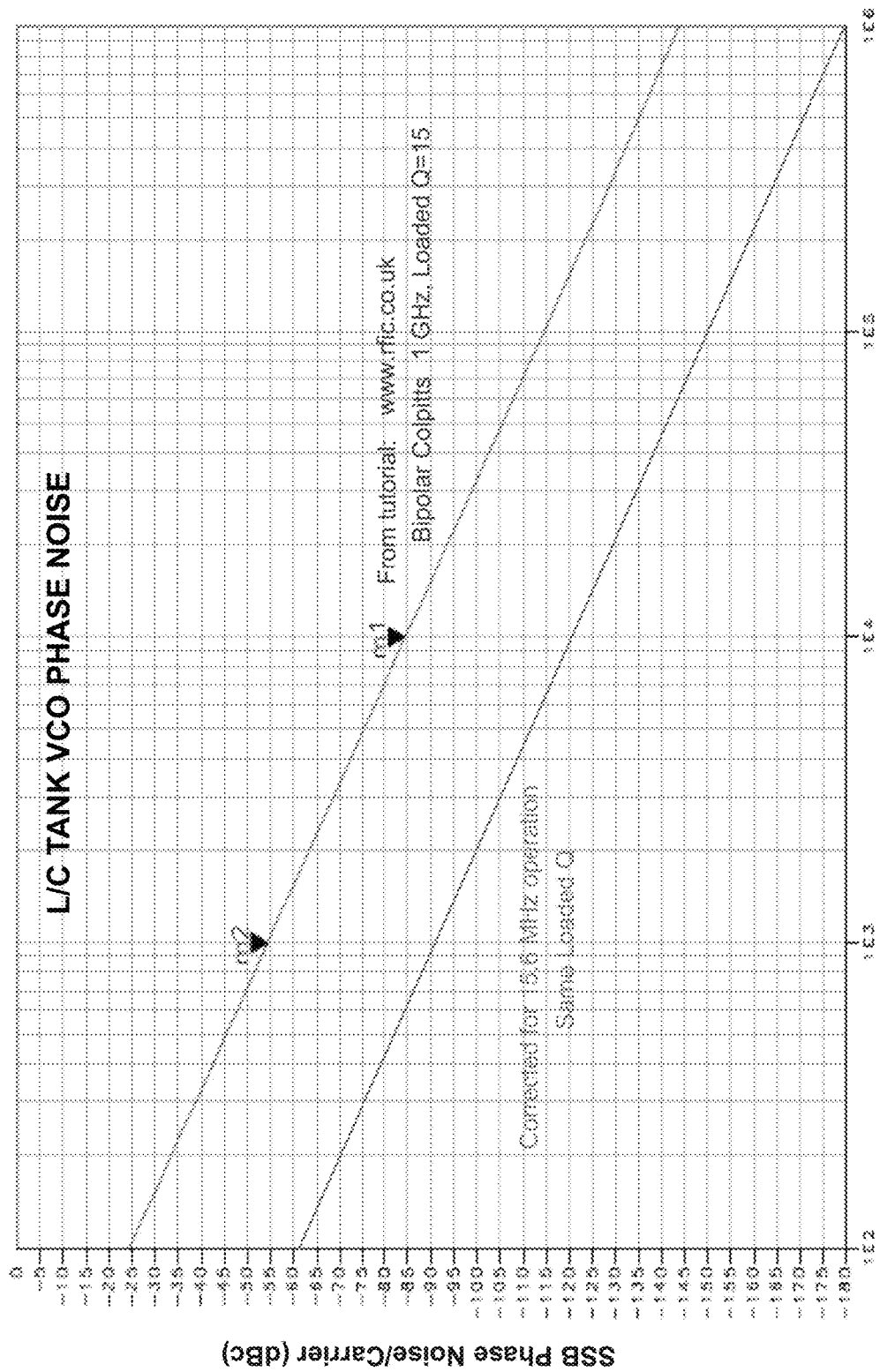

FIGS. 9A/9B provide example phase noise plots for low frequency self-controlled oscillators, that are continuously frequency agile. FIG. 9A illustrates phase noise for an oscillator using tuned circuits having high loaded Q, and FIG. 9B illustrates phase noise for an oscillator with a Q=15. Such a low frequency self-controlled oscillator can have phase noise that is superior to that of many signal sources delivering 1 GHz and above, including some that are resonator controlled using a phase locked loop. In particular, phase noise ratio density can be superior for the low frequency self-controlled oscillator. FIG. 9A shows that at 10 MHz, a frequency-agile self-controlled oscillator is capable of −156 dBc/Hz phase noise ratio density at a modulating frequency of 10 KHz. It should be noted, however, that, especially for the high Q case, owing to the larger value tuned circuit components required for low frequencies, it may not be possible to integrate them.

Figure 10:
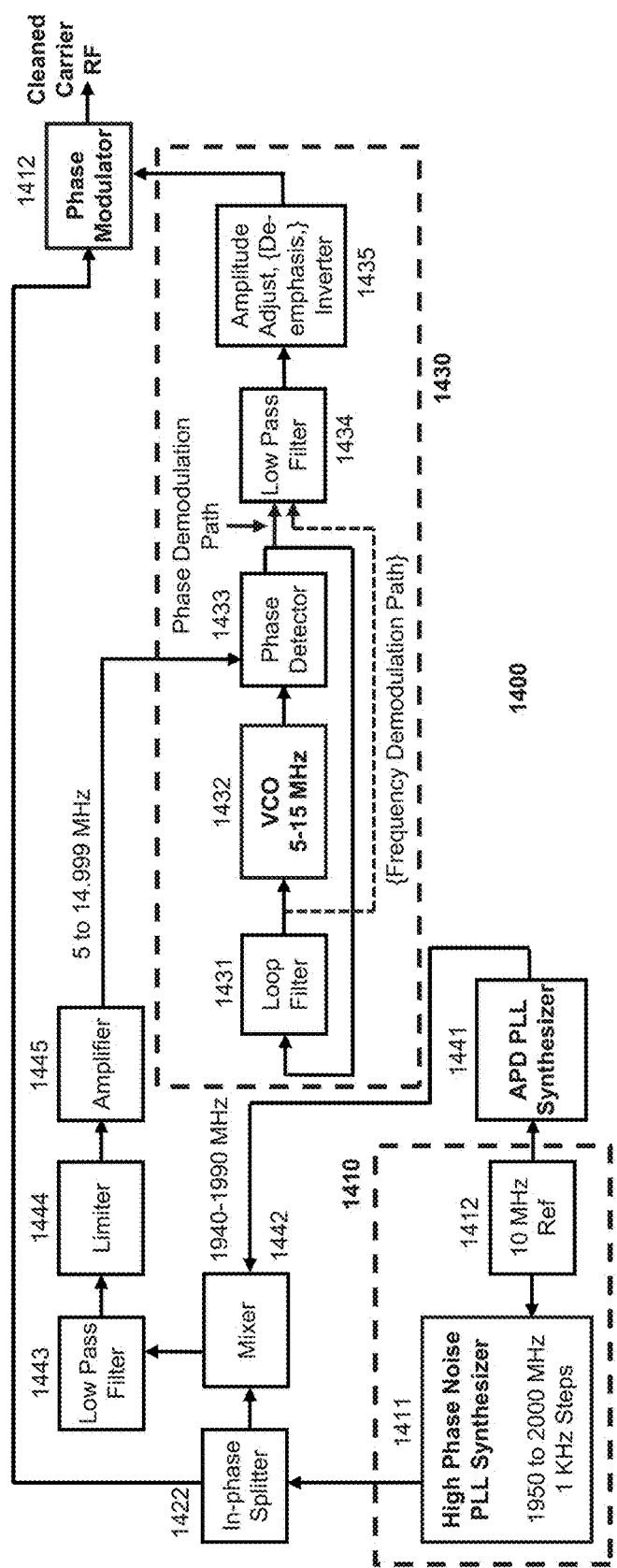
FIGS. 10 and 11 illustrate additional embodiments architectures employing the signal cancellation methodology according to this Disclosure, that illustrate the use, for some applications, of local oscillators with phase detectors instead of FM detectors.
Figure 11:
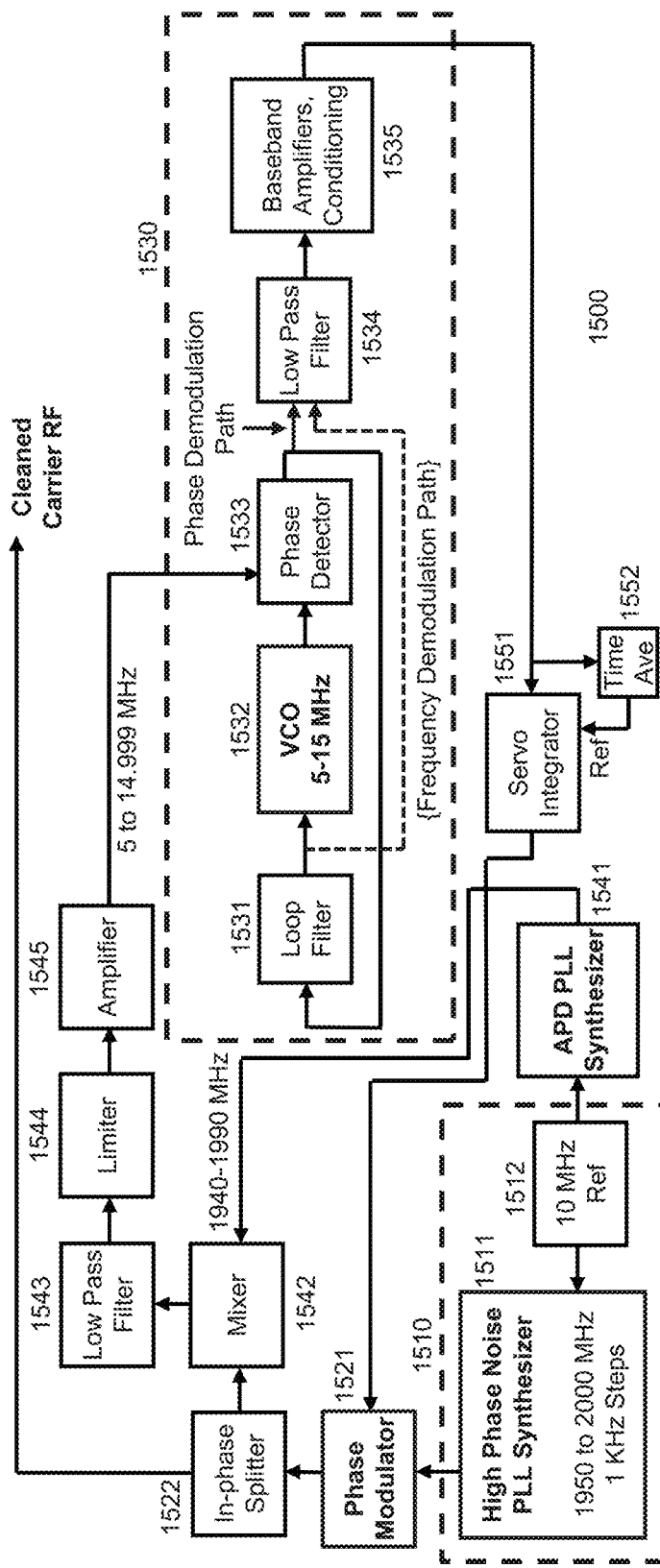

FIGS. 10 and 11 illustrate additional embodiments architectures employing the signal cancellation methodology according to this Disclosure, that illustrate the use, for some applications, of local oscillators with phase detectors instead of FM detectors.

FIG. 10 illustrates an example architecture that uses a VCO and phase detector operating in the 5 MHz to 15 MHz range, using a feedforward topology. It should be noted that this architecture, one example of an angle modulation receiver, could be used just as well for the feedback topology illustrated in FIG. 4. It takes the place of the FM Detector block, containing Slope Detector Filter 533, Envelope Detector 534 and at least parts of Block 535, containing amplifiers, etc.

FIG. 10 is similar to FIG. 11 of U.S. Pat. No. 8,750,441-B2. The purpose for all blocks 1441 through 1445 is to down-convert the signal from PLL Synthesizer 1411, but with a carrier between 5 and 15 MHz, as an "intermediate frequency" where it can be compared with the very low phase noise reference oscillator VCO 1432. The down-conversion process adds the phase noise and other contamination from the APD PLL Synthesizer 1441. This contamination level could be much lower than that of Synthesizer 1411, Source to be Cleaned, owing to the inherent characteristics of aperture phase detectors and the relatively wide channel spacing of 10 MHz. Therefore, the phase noise and other angle modulated contamination delivered by Amplifier 1445 is essentially the same as that being delivered by PLL Synthesizer 1411.

In order to have lowest phase noise along with lowest power drain, the voltage controlled oscillator ("VCO") 1432 needs a high Q tuned tank circuit. As discussed in a previous paragraph, however, even low Q values can result in useful phase noise levels. The loop filter 1431 filters the output of the phase detector 1433 and generates an output that controls the VCO 1432 to have the same average frequency as that of the signal from the down-converted PLL Synthesizer 1411 as it passes through Amplifier 1425, and an input to output phase difference that averages 90°. The phase detector 1433 provides what is essentially the arithmetic product of its input signals to its output voltage, which averages to 0V. The combined phase modulation on the signals from the Amplifier 1425 and VCO 1432 appears at the phase detector's output as an AC baseband signal. Inasmuch as the VCO 1432 has very low phase noise and other angle modulation compared with the signal from Amplifier 1425, the AC signal at the output of the phase detector 1433 is essentially the demodulated waveform of all energy that is angle-modulating the signal from Amplifier 1425.

The VCO could also include additional circuitry, such as operating at a frequency range at a multiple of the 5 MHz to 15 MHz range, followed by a frequency divider to equalize the frequency band with the signal from Amplifier 1425. Operating the VCO at a higher frequency and frequency dividing to the 5 to 15 MHz range can be chosen to decrease the values, sizes and costs of the high Q tuned circuit components, possibly even permitting integration of these components. Phase detector 1433 compares the phases of the signals from VCO 1424 and the down converted signal source through Amplifier 1425. Low Pass Filter 1434 removes vestiges of carrier frequency energy existing between 5 MHz and 15 MHz leaving only the baseband signal. The Amplitude Adjust/De-emphasis/Inverter block 1435 amplifies the output of the phase detector Low Pass Filter 1434 and provides the amplified and inverted signal to the phase modulator 1422.

Loop Filter 1431 includes any suitable structure for filtering a signal, such as a low-pass filter and/or a servo integrator. The VCO 1432 includes any suitable oscillator for generating a monochromatic signal having far less phase noise and spurious contamination than the signal from Amplifier 1425. The Phase Detector 1432 includes any suitable structure for comparing the phases of multiple input signals. The Amplitude Adjust/Inverter Block 1435 includes any suitable structure for amplifying and adjusting the amplitude of a baseband signal.

Loop Filter 1431, VCO 1432, and Phase Detector 1433 operate to identify the angle modulation contamination in the source signal from the source 1411. That contamination is output by Phase Detector 1433 as a baseband signal, effectively demodulating the phase noise and other contamination. The baseband signal is then processed as explained above and fed to Modulator 1422, which modulates the source signal from PLL Synthesizer 1411 using the amplified and inverted baseband signal. The output of Phase Modulator 1422 is the PLL Synthesizer 1411 signal with reduced angle modulation contamination.

Similar to FIG. 2, Phase Modulator 1422 corresponds to Phase Modulator 232. Splitter 1421 corresponds to Splitter 231. Low Pass Filter, and Amplifier Adjust, De-emphasis, Inverter 1434 and 1435 corresponds to Baseband Processor and Amplifier 234 and 235. VCO 1432 corresponds to Phase Reference 236. Finally, FM/PM Detector 233 corresponds to the combination of 10 MHz Reference 1412, Synthesizer 1441, Mixer 1442, Low Pass Filter 1443, Limiter 1444, Amplifier 1445, Loop Filter 1431, and Phase Detector 1433.

Even though Phase Detector 1433, if properly phased, discriminates against the demodulation of amplitude information existing on the Source signal to be cleaned, nevertheless Limiter 1444 is shown in FIG. 10. If additional suppression of AM components is needed, including to obtain the lowest possible output phase noise and other angle modulation, none of the blocks in FIG. 10 would need duplication. AM demodulator and modulator blocks would be substituted for Block 1430 and Phase Modulator 1422. AM demodulation could be accomplished by a variety of methods, such as by using an in-phase phase detector instead of the quadrature phase detector used in Block 1433. Such AM detectors could be plugged into Blocks 104, 223, 322, 332, and/or 523, just as angle modulation detectors from this figure could be plugged into Blocks 233, 342, and/or 533/534.

FIG. 11 illustrates and example architecture that is a similar to the architecture of FIG. 10, but configured for the feedback cancellation architecture described in connection with FIG. 4.

Similar to FIG. 4, Phase Modulator 1521 corresponds to Phase Modulator 531. Splitter 1522 corresponds to Splitter 532. Servo Integrator 1551 corresponds to Servo Integrator 537. Time Averaging block 1552 corresponds to Time Averaging block 536. Low Pass Filters, and Baseband Amplifiers and Conditioning 1534 and 1535 corresponds to Baseband Amplifier and Filter 535. Finally, FM Detector 533 and 534 correspond to the combination of 10 MHz Reference 1512, Synthesizer 1541, Mixer 1542, Low Pass Filter 1543, Limiter 1544, Amplifier 1545, Loop Filter 1531, VCO 1532, and Phase Detector 1533.

The Conditioning block 1535 amplifies the output of the phase detector Low Pass Filter 1534 and provides the amplified signal to Servo Integrator 1551. The Conditioning Block 1535 includes any suitable structure for amplifying and adjusting the amplitude of a baseband signal.

Operation of the loop, including Phase Modulator 1521 is the same as that shown in the text for FIG. 4, Blocks 536, 537, and 531. Loop Filter 1531, VCO 1532, and Phase Detector 1533 operate to identify the remaining angle modulation contamination from the source 1511 that has not been removed by the action of the feedback loop. The output of Phase Modulator 1521 and Splitter 1522 is the PLL Synthesizer 1511 signal with reduced angle modulation contamination.

In general summary, the Disclosure of embodiments and methodology for signal cancellation of amplitude/angle modulation noise (unwanted spectral energy) using feedforward and feedback topologies can be used to achieve cancellation of amplitude noise and/or phase noise, period jitter, deterministic spectral components, and other types of amplitude and/or angle noise by processing a source signal after the source signal has been generated. Depending upon the implementation, this technique can provide significant benefits in a range of fields, such as any fields in which timing generator (clock) products and/or local oscillators are used. As particular examples, the timing generator products could include clock generation, conditioning, and distribution products. As further particular examples, this technique could be used with radio frequency (RF) equipment's local oscillator sources, which are used in frequency conversion, phase detection, and various other system modules in receivers, transmitters, and other equipment.

The Disclosure provided by this Description and the FIGS. sets forth example embodiments and applications illustrating aspects and features of the invention, and does not limit the scope of the invention, which is defined by the claims. Known circuits, functions and operations are not described in detail to avoid obscuring the principles and features of the invention. References to particular voltages, frequencies, noise levels, gains, resistances, capacitances, and other values, are for illustration only. These example embodiments and applications can be used by ordinarily skilled artisans as a basis for modifications, substitutions and alternatives to construct other embodiments, including adaptations for other applications.

The invention claimed is:

1. A method suitable to cancel amplitude modulation noise (contamination) of a carrier signal, comprising
   receiving an input carrier signal from a source that generates a monochromatic carrier signal that, prior to reception as the input carrier signal, is contaminated with an amplitude modulation noise signal;
   demodulating the amplitude modulation noise signal to generate a baseband amplitude modulation noise signal;
   signal processing the baseband amplitude modulation noise signal to generate an amplitude modulation noise cancelation signal; and
   amplitude modulating the input carrier signal based on the amplitude modulation noise cancelation signal to generate an output carrier signal, the output carrier signal having less amplitude modulation noise than the input carrier signal.

2. The method of claim 1, wherein
   receiving the input carrier signal includes splitting the input carrier signal to provide the input carrier signal to a signal path, and to a feedforward path;
   the feedforward path including
      demodulating the amplitude noise signal to generate a feedforward baseband modulation noise signal, and
      signal processing the feedforward baseband modulation noise signal based on signal inversion to generate a feedforward amplitude modulation noise cancelation signal; and
   the signal path including amplitude modulating the input carrier signal based on the feedforward amplitude modulation noise cancelation signal to generate the output carrier signal.

3. The method of claim 2, further comprising
   a cancellation optimization feedback loop responsive to the output carrier signal to adjust the feedforward amplitude modulation noise cancelation signal to increase cancelation of the amplitude modulation noise signal in the output carrier signal.

4. The method of claim 1, wherein:
   receiving the input carrier signal includes
      controlling an amplification gain of the input carrier signal to generate a gain-controlled input carrier signal,
      splitting the gain-controlled input carrier signal to provide the output carrier signal, and a feedback gain-controlled input carrier signal in a feedback path;
   the feedback path including
      demodulating the amplitude noise modulation signal in the feedback gain-controlled input carrier signal to generate a feedback baseband modulation noise signal; and
      integrating the feedback baseband modulation noise signal to generate a feedback gain control signal; and
      adjusting the amplification gain of the input carrier signal based on the feedback gain control signal, to amplitude modulate the input carrier signal based on the feedback gain control signal to generate the output carrier signal.

5. The method of claim 4, wherein
   in the feedback path, generating the feedback baseband modulation noise signal includes filtering the demodulated amplitude noise modulation signal.

6. The method of claim 3, wherein
   the feedforward path further includes controlling, based on a feedback cancelation optimization signal, a gain of the feedforward amplitude modulation noise cancelation signal used in amplitude modulating the input carrier signal to increase cancelation of the amplitude modulation noise signal in the output carrier signal;
   the cancelation optimization feedback loop comprises:
      splitting the output carrier signal to obtain a feedback output carrier signal;
      demodulating the amplitude noise modulation signal in the feedback output carrier signal to generate a feedback baseband modulation noise signal; and generating the feedback cancelation optimization signal based on
  determining a polarity of the feedback baseband modulation noise signal;
  integrating the feedback baseband modulation noise signal to obtain an integrated cancelation optimization value; and
  generating the feedback cancelation optimization signal based on the determined polarity of the feedback based band modulation noise signal and the integrated cancelation optimization value.

7. A circuit for use in as system including a carrier signal source that generates a carrier signal that is monochromatic, comprising
an input node coupled to receive from the source an input carrier signal that, prior to reception as the input carrier signal, is contaminated with an amplitude modulation noise signal;
demodulation circuitry to demodulate the amplitude modulation noise signal to generate a baseband amplitude modulation noise signal;
signal processing circuitry to receive the baseband amplitude modulation noise signal, and generate an amplitude modulation noise cancelation signal; and
amplitude modulation noise cancellation circuitry to amplitude modulate the input carrier signal based on the amplitude modulation noise cancelation signal, and generate at an output node an output carrier signal, the output carrier signal having less amplitude modulation noise than the input carrier signal.

8. The circuit of claim 7,
further comprising a first signal splitter coupled to receive the input carrier signal from the input node, to split the input carrier signal and provide the input carrier signal to a signal path, and to a feedforward path;
the feedforward path including
  first demodulation circuitry to demodulate the amplitude noise signal, and generate a feedforward baseband modulation noise signal, and
  the signal processing circuitry to receive the feedforward baseband modulation noise signal, and generate a feedforward amplitude modulation noise cancelation signal based on signal inversion; and
the signal path including
  the amplitude modulation noise cancelation circuitry to amplitude modulate the input carrier signal based on the feedforward amplitude modulation noise cancelation signal, and generate the output carrier signal.

9. The circuit of claim 8, further comprising
cancellation optimization feedback circuitry responsive to the output carrier signal to adjust the feedforward amplitude modulation noise cancelation signal to increase cancelation of the amplitude modulation noise signal in the output carrier signal.

10. The circuit of claim 9,
further comprising, in the feedforward path, gain control circuitry responsive to a feedback cancelation optimization signal, to control a gain of the feedforward amplitude modulation noise cancelation signal used in amplitude modulating the input carrier signal to increase cancelation of the amplitude modulation noise signal in the output carrier signal; and
the cancelation optimization feedback circuitry comprising:
  a second signal splitter coupled to receive the output carrier signal, and provide a feedback output carrier signal;
  second demodulation circuitry to demodulate the amplitude noise modulation signal in the feedback output carrier signal, and generate a feedback baseband modulation noise signal; and
  cancelation optimization control circuitry to generate the feedback cancelation optimization signal, based on
    determining a polarity of the feedback baseband modulation noise signal;
    integrating the feedback baseband modulation noise signal to obtain an integrated cancelation optimization value; and
    generating the feedback cancelation optimization signal based on the determined polarity of the feedback based band modulation noise signal, and the integrated cancelation optimization value.

11. A system suitable for canceling amplitude modulation noise that contaminates an input carrier signal, comprising
an input carrier signal source to generate an input carrier signal that is monochromatic, the input carrier signal contaminated with an amplitude modulation noise signal; and
an amplitude modulation noise signal cancellation circuit, including
  demodulation circuitry to demodulate the amplitude modulation noise signal to generate a baseband amplitude modulation noise signal;
  signal processing circuitry to receive the baseband amplitude modulation noise signal, and generate an amplitude modulation noise cancelation signal; and
  amplitude modulation noise cancellation circuitry to amplitude modulate the input carrier signal based on the amplitude modulation noise cancelation signal, and generate at an output node an output carrier signal, the output carrier signal having less amplitude modulation noise than the input carrier signal.

12. The system of claim 11, the amplitude modulation noise signal cancellation circuit:
further comprising a first signal splitter coupled to receive the input carrier signal from the input node, to split the input carrier signal and provide the input carrier signal to a signal path, and to a feedforward path;
the feedforward path including
  first demodulation circuitry to demodulate the amplitude noise signal, and generate a feedforward baseband modulation noise signal, and
  the signal processing circuitry to receive the feedforward baseband modulation noise signal, and generate a feedforward amplitude modulation noise cancelation signal based on signal inversion; and
the signal path including
  the amplitude modulation noise cancelation circuitry to amplitude modulate the input carrier signal based on the feedforward amplitude modulation noise cancelation signal, and generate the output carrier signal.

13. The circuit of claim 12, the amplitude modulation noise signal cancellation circuit further comprising:
cancellation optimization feedback circuitry responsive to the output carrier signal to adjust the feedforward amplitude modulation noise cancelation signal to increase cancelation of the amplitude modulation noise signal in the output carrier signal.

14. The circuit of claim 13,
the feedforward path further including gain control circuitry responsive to a feedback cancelation optimization signal, to control a gain of the feedforward amplitude modulation noise cancelation signal used in re-modulating the input carrier signal to increase cancelation of the amplitude modulation noise signal in the output carrier signal; and the cancelation optimization feedback circuitry comprising:
   a second signal splitter coupled to receive the output carrier signal, and provide a feedback output carrier signal;
   second demodulation circuitry to demodulate the amplitude noise modulation signal in the feedback output carrier signal, and generate a feedback baseband modulation noise signal; and
   cancelation optimization control circuitry to generate the feedback cancelation optimization signal, based on
      determining a polarity of the feedback baseband modulation noise signal;
      integrating the feedback baseband modulation noise signal to obtain an integrated cancelation optimization value; and
      generating the feedback cancelation optimization signal based on the determined polarity of the feedback based band modulation noise signal, and the integrated cancelation optimization value.

* * * * *